US011669158B2

(12) United States Patent
Kim et al.

(10) Patent No.: US 11,669,158 B2
(45) Date of Patent: Jun. 6, 2023

(54) DETECTING DEVICE

(71) Applicants: SAMSUNG DISPLAY CO., LTD., Yongin-si (KR); INHA UNIVERSITY RESEARCH AND BUSINESS FOUNDATION, Incheon (KR)

(72) Inventors: Young Chan Kim, Incheon (KR); Min Gyeong Jo, Suwon-si (KR); Byung Cheol Song, Seoul (KR); Kang Il Lee, Incheon (KR); Jun Ho Choi, Siheung-si (KR)

(73) Assignees: SAMSUNG DISPLAY CO., LTD., Yongin-si (KR); INHA UNIVERSITY RESEARCH AND BUSINESS FOUNDATION, Incheon (KR)

(*) Notice: Subject to any disclaimer, the term of this patent is extended or adjusted under 35 U.S.C. 154(b) by 232 days.

(21) Appl. No.: 17/095,906

(22) Filed: Nov. 12, 2020

(65) Prior Publication Data

US 2021/0142032 A1 May 13, 2021

(30) Foreign Application Priority Data

Nov. 13, 2019 (KR) .................. 10-2019-0144853

(51) Int. Cl.
*G06F 3/01* (2006.01)
*G06T 11/00* (2006.01)
*G06T 9/00* (2006.01)
*G06V 40/18* (2022.01)
*G06V 40/19* (2022.01)
(Continued)

(52) U.S. Cl.
CPC .............. *G06F 3/013* (2013.01); *G06T 9/002* (2013.01); *G06T 11/00* (2013.01); *G06V 10/764* (2022.01);
(Continued)

(58) Field of Classification Search
None
See application file for complete search history.

(56) References Cited

U.S. PATENT DOCUMENTS 6,791,584 B1 * 9/2004 Xie .................. G06Q 30/02
351/227
7,653,221 B2 * 1/2010 Gu .................. G06V 40/171
382/254
(Continued)

FOREIGN PATENT DOCUMENTS

KR 10-2009-0093223 9/2009
KR 10-1373274 3/2014
KR 10-1704717 2/2017

*Primary Examiner* — Anand P Bhatnagar
(74) *Attorney, Agent, or Firm* — F. Chau & Associates, LLC

(57) ABSTRACT

Systems and methods for detecting eye information are described. According to one embodiment, a detecting device includes a determination unit, a generation unit, and a detection unit. The determination unit is configured to determine whether a user wears glasses from an input image by using a first neural network including a plurality of filters. The generation unit is configured to generate a face image in which the glasses are removed from the input image by using a learned generator when a glasses-wearing signal is received from the determination unit. The detection unit is configured to generate an eye image by receiving the input image from the determination unit or receiving the face image from the generation unit and detect a pupil from the eye image using a second neural network including a plurality of filters.

24 Claims, 20 Drawing Sheets

(51) Int. Cl.
  *G06V 40/16* (2022.01)
  *G06V 10/764* (2022.01)
  *G06V 10/82* (2022.01)

(52) U.S. Cl.
  CPC ............ *G06V 10/82* (2022.01); *G06V 40/171* (2022.01); *G06V 40/19* (2022.01); *G06V 40/193* (2022.01); *G06T 2207/20024* (2013.01); *G06T 2207/20076* (2013.01); *G06T 2207/20101* (2013.01); *G06T 2207/20182* (2013.01); *G06T 2207/30041* (2013.01)

(56) References Cited

U.S. PATENT DOCUMENTS

| | | | |
|---|---|---|---|
| 10,459,256 B2 * | 10/2019 | Fonte ..................... | G16H 50/50 |
| 10,869,028 B2 * | 12/2020 | Heo ..................... | H04N 13/366 |
| 11,055,829 B2 * | 7/2021 | Qin ........................ | G06T 5/002 |
| 11,221,501 B2 * | 1/2022 | Chalberg, Jr. ......... | G02C 7/104 |
| 11,333,906 B2 * | 5/2022 | Ohlendorf ............ | G02C 13/005 |
| 11,341,612 B1 * | 5/2022 | Martin ................... | G06T 5/001 |
| 11,366,343 B2 * | 6/2022 | Varady ................ | G06V 40/171 |
| 11,403,876 B2 * | 8/2022 | Tai ........................ | G06V 10/82 |
| 2006/0193515 A1 * | 8/2006 | Kim ..................... | G06V 40/161 |
| | | | 382/173 |
| 2007/0177793 A1 * | 8/2007 | Gu ....................... | G06V 40/171 |
| | | | 382/159 |
| 2008/0074440 A1 * | 3/2008 | Xie ..................... | G06Q 10/087 |
| | | | 345/634 |
| 2017/0249509 A1 * | 8/2017 | Blixt ..................... | A61B 3/145 |
| 2020/0169678 A1 * | 5/2020 | Kang ........................ | G06T 7/70 |
| 2021/0088811 A1 * | 3/2021 | Varady ................ | G06V 20/653 |
| 2021/0208425 A1 * | 7/2021 | Petrillo, Sr. ............. | A61F 9/023 |
| 2022/0218198 A1 * | 7/2022 | Devani ................. | G16H 50/30 |

* cited by examiner

DETECTING DEVICE

This application claims priority from Korean Patent Application No. 10-2019-0144853 filed on Nov. 13, 2019, in the Korean Intellectual Property Office, the disclosure of which is incorporated by reference herein in its entirety.

BACKGROUND

1. Field of the Disclosure

The present disclosure relates to a detecting device for detecting a pupil in an input image.

2. Description of the Related Art

Eye tracking devices measure the position and movement of an individual's eye. Eye tracking technology is used in applications such as visual research, marketing, and military. Examples of eye tracking technology are gaze tracking technology, iris recognition technology, and pupil detection technology.

In some cases, display devices may acquire eye information of a user wearing glasses (e.g., a user operating the device). Eyeglasses refract light in such a way that an eye tracking device may not accurately determine eye information. Thus, wearing glasses may influence the outcome of eye tracking devices. Therefore, there is a need in the art for an eye tracking device that can function when a user is wearing glasses.

SUMMARY

Aspects of the present disclosure provide a detecting device configured to detect whether a user wears glasses from various input images, and when the user wears the glasses, the glasses are removed from the input images to detect a pupil, thereby removing false detection to improve detecting performance.

It should be noted that objects of the present disclosure are not limited to the above-described objects, and other objects of the present disclosure will be apparent to those skilled in the art from the following descriptions.

According to one or more embodiments of the present disclosure, a detecting device comprises: a determination unit configured to determine from an input image whether a user wears glasses by using a first neural network including a first plurality of filters, a generation unit configured to generate a face image in which the glasses are removed from the input image by using a learned generator when a glasses-wearing signal is received from the determination unit, and a detection unit configured to generate an eye image by receiving the input image from the determination unit or receiving the face image from the generation unit and detect a pupil from the eye image using a second neural network including a second plurality of filters.

The first neural network may comprise: a first filter configured to output a feature map by performing weighted convolution filtering, a second filter configured to calculate an overall average of pixel values of the feature map, and a third filter configured to apply an activation function to output of the second filter.

The generation unit may comprise: a first image set including images including a person wearing glasses, a second image set including images including a person not wearing glasses, a first generator configured to map a first image selected from the first image set to generate an image having a feature of the second image set, and a second generator configured to map a second image selected from the second image set to generate an image having a feature of the first image set.

The generation unit may further comprise: a first function unit configured to calculate a probability that an image mapped by the first generator is included in the second image set, and a second function unit configured to calculate a probability that an image mapped by the second generator is included in the first image set.

The generation unit may change a weight of the first generator based on the probability calculated by the first function unit and may change a weight of the second generator based on the probability calculated by the second function unit.

The generation unit may primarily map the first image using the first generator and may secondarily map the first image using the second generator to compare an image, which is obtained by secondarily mapping the first image, with the first image, and the generation unit may primarily map the second image using the second generator and may secondarily map the second image using the first generator to compare an image, which is obtained by secondarily mapping the second image, with the second image.

The generation unit may calculate a loss function based on a comparison result between the image, which is obtained by secondarily mapping the first image, and the first image and based on a comparison result between the image, which is obtained by secondarily mapping the second image, and the second image. The generation unit may change a weight of each of the first and second generators based on the loss function.

The detection unit may extract landmarks of eyes from the input image or the face image and may generate the eye image based on a midpoint between the landmarks of the eyes. The detection unit may generate a target image based on pupil coordinate data acquired from a learning image and may learn a weight of the second neural network so as to allow a main filter image obtained by filtering the learning image using the second neural network to be similar to the target image by as much as a preset reference.

The second neural network may comprise: a first filter configured to output a feature map by performing weighted convolution filtering, a fourth filter configured to select a max value from an input feature map to perform max-pooling filtering, and a fifth filter configured to perform upsampling filtering on the input feature map. The second neural network may comprise an encoder comprising at least one fourth filter. The second neural network may comprise a decoder comprising at least one fifth filter and at least one first filter.

The second neural network may further comprise a skip connection network which connects a feature map input to the encoder to a feature map in which upsampling filtering is performed on output of the encoder. The second neural network may further comprise an auxiliary filter comprising at least one fourth filter and at least one fifth filter.

The detection unit may merge the feature map input to the encoder and the feature map in which the upsampling filtering is performed on output of the encoder, may generate a main filter image by performing convolution filtering on the merged feature map, and may generate an auxiliary filter image by filtering output of the encoder using the auxiliary filter.

The detection unit may calculate a loss function based on the target image, the main filter image, the learning image, and the auxiliary filter image and may change a weight of the second neural network according to the loss function. The detection unit may acquire pupil coordinate data by labeling the learning image and may generate the target image by expanding the pupil coordinate data and performing Gaussian filtering.

The detection unit may generate a pupil area segmentation image by filtering the eye image using the learned second neural network and may detect two-dimensional pupil coordinates by removing noise of the pupil area segmentation image and indexing the pupil area segmentation image. The detection unit may detect three-dimensional pupil coordinates by correcting the two-dimensional pupil coordinates based on depth information extracted from the input image.

According to one or more embodiments of the present disclosure, a method of detecting eye information includes receiving an input image; determining that a user is wearing glasses based on the input image; generating a face image from the input image based on the determination, wherein the face image comprises an image of the user without glasses; and detecting eye information of the user based on the face image.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION OF THE EMBODIMENTS

Figure 1:
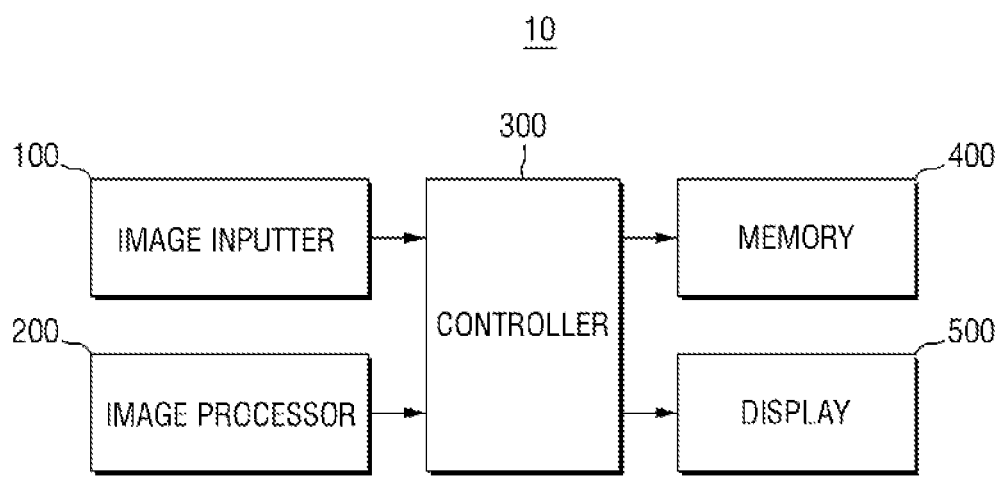
FIG. 1 is a block diagram illustrating a detecting device according to an exemplary embodiment.

The present disclosure relates generally to a detecting device, and more specifically, to a device for detecting eye information. Eye tracking devices measure the position and movement of an individual's eye. They can be used in applications such as visual research, marketing, and military. In many cases, eye detecting devices monitor users wearing glasses. Eyeglasses refract light in such a way that an eye tracking device may not accurately determine eye information. Thus, wearing glasses may influence the outcome of eye tracking devices.

Therefore, a detecting device is described that can effectively track eye information for users wearing glasses. The detecting device may include a determination unit, a generation unit, and a detection unit. The determination unit is configured to determine whether a user wears glasses from an input image by using a first neural network including a plurality of filters. The generation unit is configured to generate a face image in which the glasses are removed from the input image by using a learned generator when a glasses-wearing signal is received from the determination unit. The detection unit is configured to generate an eye image by receiving the input image from the determination unit or receiving the face image from the generation unit and detect a pupil from the eye image using a second neural network including a plurality of filters.

When a user wears glasses, the generation unit can provide a face image where the glasses are removed. The face image is provided to a detection unit. The detection unit can detect a pupil from the face image where glasses are removed. When the user does not wear the glasses, the detection unit can detect the pupil by receiving the input image without changes to the face image. Therefore, the detecting device can prevent false detection and improve detecting performance regardless of whether the user wears the glasses.

In the following description, for the purposes of explanation, numerous specific details are set forth to provide a thorough understanding of various exemplary embodiments or implementations of the present disclosure. As used herein, "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, the element may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another or may represent different directions that are not perpendicular to one another. For the purposes of this disclosure, "at least one of X, Y, and Z" and "at least one selected from the group with X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish an element from another element. Therefore, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe the relationship of one element to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Therefore, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Therefore, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, the blocks, units, and/or modules may be programmed and controlled using software (e.g., microcode) to perform various functions discussed herein and may optionally be driven by firmware and/or software.

Additionally, each block, unit, and/or module may be implemented by dedicated hardware or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted with a meaning consistent with their meaning in the context of the relevant art and should not be interpreted in an idealized or overly formal sense, unless expressly so defined herein.

FIG. 1 is a block diagram illustrating a detecting device according to an exemplary embodiment.

Referring to FIG. 1, a detecting device 10 may detect whether a user wears glasses from an input image captured by the user. For example, the input image may correspond to an image of the whole or a portion of a face including an eye of the user. When the user wears the glasses, the detecting device 10 may generate a face image from which the glasses are removed and may detect a pupil by generating an eye image from the face image. When the user does not wear the glasses, the detecting device 10 may detect a pupil by generating an eye image from the input image.

The detecting device 10 may include a camera configured to capture a face image, an infrared ray transmitting filter, a visible light blocking filter, and the like. For example, the camera may include a high magnification lens to enlarge and photograph a portion around the eye of the user.

The detecting device 10 may include an image inputter 100, an image processor 200, a controller 300, a memory 400, and a display 500.

The image inputter 100 may be mounted on a surface of the detecting device 10 and may photograph the face of the user. The image inputter 100 may include a camera including a lens, an image sensor, a flash, and the like. The image inputter 100 may capture a still image or a moving image and may provide a captured image signal to the image processor 200. For example, an image signal may be output from an image sensor including a plurality of pixels arranged in an m-by-n matrix structure (wherein m and n are a natural number). Additionally, the image signal may be formed of a set of voltages (for example, pixel values) corresponding to the plurality of pixels.

The image processor 200 may detect an eye area from an input image. An image captured using the camera may include brightness information, and the image processor 200 may detect the eye area based on the brightness information. For example, the image processor 200 may select an area with a relatively bright pixel value as the eye area since reflected light of a corneal area has a pixel value brighter than that of reflected light of an area around a cornea. In another example, the image processor 200 may select an area as the eye area, which has a pixel value of reflected light with a large difference from that of an area therearound, since a difference between a pixel value of the reflected light of the corneal area and a pixel value of the reflected light of the area around the cornea is large.

The image processor 200 may detect whether the user wears the glasses. When the user wears the glasses, the image processor 200 may generate a face image from which the glasses are removed. When the user wears glasses, reflected light by the glasses may have a pixel value brighter than that of reflected light of an area around the glasses. Since feature information of the glasses is relatively stronger than feature information of an eye or pupil, detecting an eye area or pupil may be difficult. Accordingly, the image processor 200 may detect the pupil from the face image from which the glasses are removed, thereby preventing false detection caused by the glasses and improving detection performance.

The image processor 200 may detect the pupil by processing the image signal provided from the image inputter 100. The pupil detection of the image processor 200 may be applied to each of a still image and a moving image. For example, the image processor 200 may perform pupil detection learning through a plurality of images and may detect pupil coordinates from an input image using accumulated pupil detection data.

The controller 300 may be a central processing unit and may control an overall operation of the detecting device 10. Additionally, the controller 300 may control a function of the detecting device 10 according to a detection result of a pupil of a user. For example, the controller 300 may receive various user inputs through the image inputter 100, as well as the display 500 in the form of a touch screen. Here, the user inputs may include various types of information including a user's touch and gesture and a pupil movement input to the detecting device 10. The controller 300 may perform a preset function of the detecting device 10 corresponding to the user input.

The memory 400 may store an operating system of the detecting device 10, a plurality of applications, data input to the detecting device 10, and the like. The memory 400 may store a picture and a moving image and may store a glasses detection algorithm, a glasses removal algorithm, a pupil detection algorithm, data for each of the algorithms, and the like. For example, the memory 400 may store filter information used to detect glasses, generator information used to remove glasses, and filter information used to detect a pupil. Information stored in the memory 400 may be updated according to repeated learning.

The display 500 may display an image based on an image signal input from the controller 300. The display 500 may be a display device such as a liquid crystal display device, a field emission display device, or an organic light-emitting display device.

The display 500 may be implemented as a touch screen including a touch panel. When a touch occurs on a surface of the display 500 by a user input tool, the display 500 may provide information about a touch position or touch pressure to the controller 300. For example, the user may touch an icon displayed on a screen of the display 500, and the detecting device 10 may execute an application corresponding to the touched icon.

Figure 2:
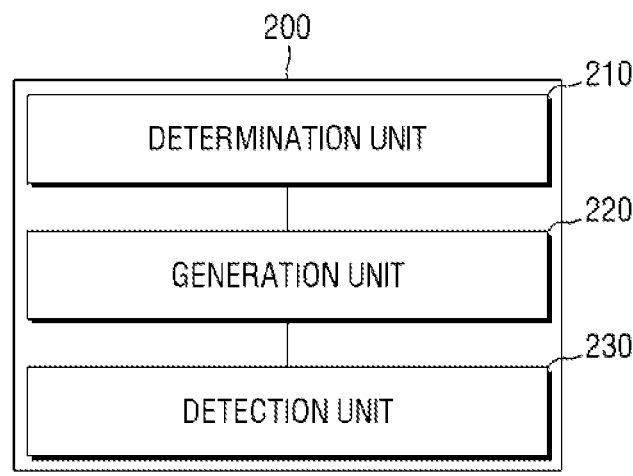
FIG. 2 is a block diagram illustrating an image processor of the detecting device according to an exemplary embodiment.
Figure 3:
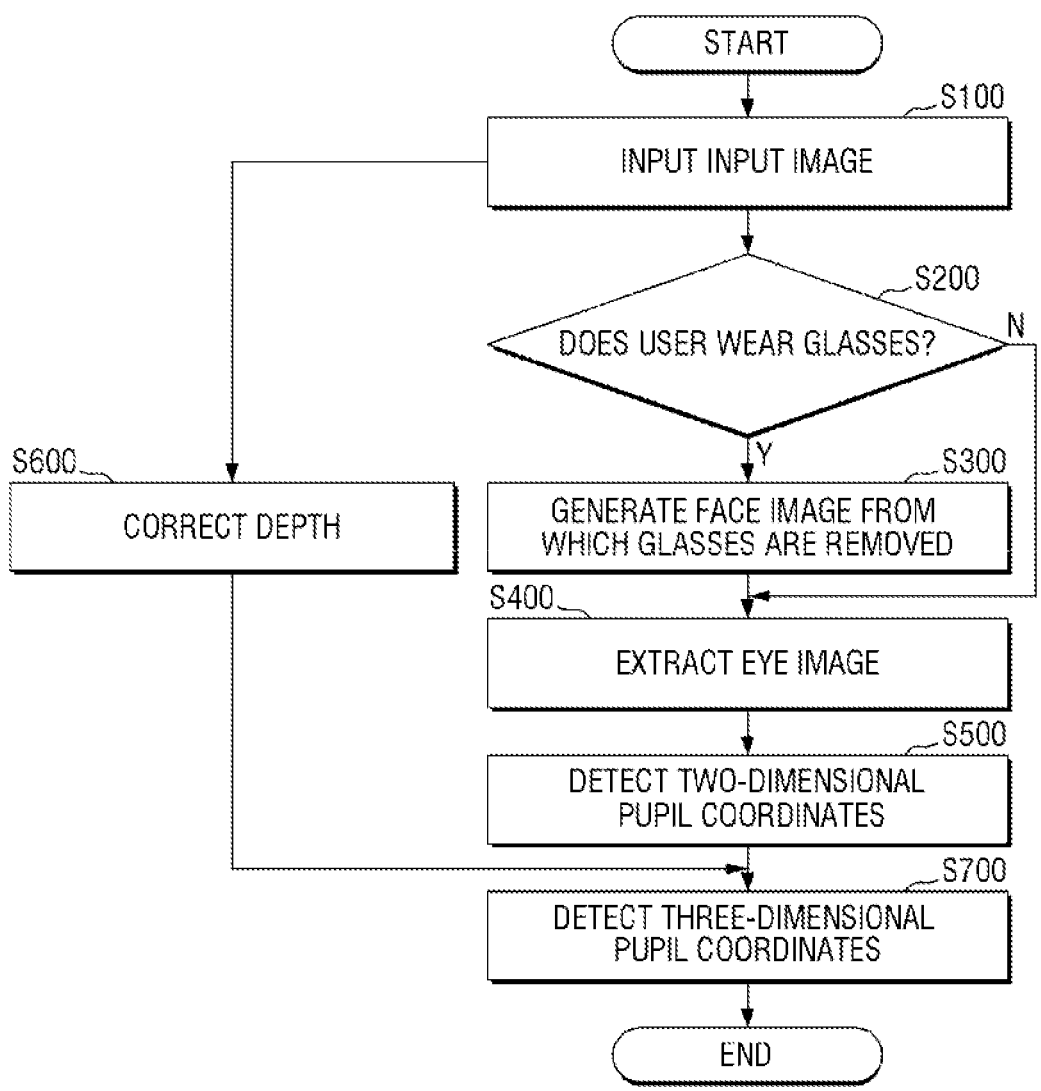
FIG. 3 is a flowchart illustrating a process of detecting a pupil of the detecting device according to an exemplary embodiment.

FIG. 2 is a block diagram illustrating the image processor of the detecting device according to an exemplary embodiment, and FIG. 3 is a flowchart illustrating a process of detecting a pupil of the detecting device according to an exemplary embodiment.

Referring to FIGS. 2 and 3, the image processor 200 may include a determination unit 210, a generation unit 220, and a detection unit 230.

In operation S100, the determination unit 210 may receive an input image from the image inputter 100. Here, the input image may include various images including a person wearing glasses or a person not wearing glasses.

In operation S200, the determination unit 210 may determine whether a user of the input image wears glasses by using a first neural network including a plurality of filters. When the user wears the glasses, the determination unit 210 may provide a glasses-wearing signal to the generation unit 220. When the user does not wear the glasses, the determination unit 210 may provide a glasses-non-wearing signal to the detection unit 230.

The determination unit 210 may learn a weight of the first neural network. The determination unit 210 may receive a learning image and may generate target data acquired from the learning image. For example, the target data may be set to 0 or 1 according to whether a user of the learning image wears glasses.

The determination unit 210 may filter the learning image using the plurality of filters of the first neural network. The determination unit 210 may learn weights of the plurality of filters of the first neural network to allow filter data acquired by filtering the learning image to match the target data. For example, the determination unit 210 may learn the weights of the plurality of filters by repeating a filtering process a preset number of times. In another example, the determination unit 210 may learn the weights of the plurality of filters by repeating the filtering process until a probability that the filter data matches the target data is greater than or equal to a reference value. When weight learning is completed, the determination unit 210 may store the weight of each of the plurality of filters of the first neural network.

The determination unit 210 may determine whether the user of the input image wears the glasses by using the first neural network with the learned weights.

In operation S300, the generation unit 220 may generate a face image from which the glasses are removed from the input image by using a learned generator when the generation unit 220 receives the glasses-wearing signal from the determination unit 210.

The generation unit 220 may include a first image set, a second image set, a first generator configured to map a first image selected from the first image set, and a second generator configured to map a second image selected from the second image set. The generation unit 220 may further include a first function unit configured to evaluate an image mapped by the first generator and a second function unit configured to evaluate an image mapped by the second generator.

The generation unit 220 may learn weights of the first generator and the second generator.

For example, the generation unit 220 may select a first image from the first image set. The first image set may include images including a person wearing glasses. The generation unit 220 may map the first image using the first generator. The first function unit may calculate a probability that the mapped image is included in the second image set. The generation unit 220 may change the weight of the first generator based on the probability that the mapped image is included in the second image set. The generation unit 220 may learn the weight of the first generator by repeating a process of mapping the first image using the first generator of which the weight is changed.

For example, the generation unit 220 may select a second image from the second image set. The second image set may include images including a person not wearing glasses. The generation unit 220 may map the second image using the second generator. The second function unit may calculate a probability that the mapped image is included in the first image set. The generation unit 220 may change the weight of the second generator based on the probability that the mapped image is included in the first image set. The generation unit 220 may learn the weight of the second generator by repeating a process of mapping the second image using the second generator of which the weight is changed.

For example, the generation unit 220 may select a first image from the first image set. The generation unit 220 may primarily map the first image using the first generator. The first function unit may compare the primarily mapped image with the second image. The generation unit 220 may secondarily map the primarily mapped image using the second generator. The second function unit may compare the secondarily mapped image with the first image. The generation unit 220 may calculate a loss function based on the primarily mapped image, the second image, the secondarily mapped image. The first image and may change the weight of each of the first and second generators based on the loss function. The generation unit 220 may primarily map the first image using the first generator of which the weight is changed and may secondarily map the primarily mapped image using the second generator of which the weight is changed, thereby learning the weight of each of the first and second generators.

Therefore, the generation unit 220 may convert the input image into the face image from which the glasses are removed by using the learned first generator.

In operation S400, the detection unit 230 may generate an eye image by receiving the input image or the face image. When the user of the input image wears the glasses, the detection unit 230 may receive a face image from which the glasses are removed from the generation unit 220. When the user does not wear the glasses, the detection unit 230 may receive an input image from the image inputter 100.

The detection unit 230 may extract landmarks of the eye from the input image or the face image and may set an eye area based on an arrangement of the landmarks of the eye. For example, the landmarks of the eye may correspond to left and right ends of the eye, but the present disclosure is not necessarily limited thereto. The detection unit 230 may calculate a midpoint between the landmarks of the eye and may set an eye area that extends by a distance between the landmarks in each of a first horizontal direction and a second horizontal direction with respect to the midpoint between the landmarks. The eye area may be set by merging an area formed from a midpoint between landmarks of a left eye and an area formed from a midpoint between landmarks of a right eye. The detection unit 230 may generate an eye image including an eye area from the input image or the face image.

In operation S500, the detection unit 230 may detect two-dimensional pupil coordinates from the eye image using a second neural network including a plurality of filters.

The detection unit 230 may learn a weight of the second neural network. The detection unit 230 may receive a learning image and may generate a target image based on pupil coordinate data acquired from the learning image. The detection unit 230 may filter the learning image using the plurality of filters of the second neural network. To allow a filter image obtained by filtering the learning image to be similar to the target image, the detection unit 230 may learn weights of the plurality of filters of the second neural network. For example, the detection unit 230 may learn the weights of the plurality of filters by repeating a filtering process a preset number of times. In another example, the detection unit 230 may learn the weights of the plurality of filters by repeating the filtering process until a probability that the filter image matches the target image is greater than or equal to a reference value. When weight learning is completed, the detection unit 230 may store the weight of each of the plurality of filters of the second neural network.

The detection unit 230 may generate a pupil area segmentation image by filtering the eye image using the second neural network with the learned weight. The detection unit 230 may separate objects included in the eye image to generate a pupil area segmentation image including pupil coordinate information. The detection unit 230 may perform a binarization operation to separate a pupil area from an area around a pupil. Accordingly, the detection unit 230 may generate the pupil area segmentation image including the pupil coordinate information by separating the remaining information from the eye image except for the pupil coordinate information.

The detection unit 230 may detect two-dimensional pupil coordinates from the pupil area segmentation image. The detection unit 230 may remove noise of the pupil area segmentation image and may detect the two-dimensional pupil coordinates by selecting at least one pixel among a plurality of pixels from which noise is removed. For example, the detection unit 230 may remove the noise of the pupil area segmentation image by removing an unrelated portion through a non-maximum suppression method and may perform indexing on the pupil area segmentation image from which the noise is removed. Accordingly, the detection unit 230 may detect the two-dimensional pupil coordinates by performing indexing on a pixel with a maximum pixel value in the pupil area segmentation image from which the noise is removed.

In operation S600, the image inputter 100 may extract depth information from the input image and may correct and provide the depth information to the detection unit 230. The image inputter 100 may be implemented as a depth camera to photograph a user. The image inputter 100 may generate depth information about the plurality of pixels based on a color or texture of a subject of the input image. Here, the depth information may include a depth hole that appears due to an actual depth being distorted. For example, the image inputter 100 may correct the depth information by applying a depth correction function to the depth information including the depth hole and may provide the corrected depth information to the detection unit 230.

In operation S700, the detection unit 230 may detect three-dimensional pupil coordinates based on the two-dimensional pupil coordinates detected from the pupil area segmentation image. Additionally, the detection unit 230 may detect the corrected depth information received from the image inputter 100.

Thus, according to one or more embodiments of the present disclosure, a method of detecting eye information includes receiving an input image; determining that a user is wearing glasses based on the input image; generating a face image from the input image based on the determination, wherein the face image comprises an image of the user without glasses; and detecting eye information of the user based on the face image.

In some cases, the method includes extracting an eye image from the face image, wherein the eye information is detected based on the eye information. In some cases, the method includes detecting two-dimensional pupil coordinates; extracting depth information from the input image; and generating three-dimensional pupil coordinates based on the two-dimensional pupil coordinates and the depth information, wherein the eye information is based at least in part on the three-dimensional pupil coordinates.

In some cases, the method includes performing convolution filtering on the input image; performing global average pooling based on an output of the convolution filtering; and applying an activation function to an output of the global average pooling, wherein the determination that the user is wearing glasses is based on the activation function.

In some cases, the determination that the user is wearing glasses is made using a first neural network including a first plurality of filters; and the eye information is detected using a second neural network including a second plurality of filters.

Figure 4:
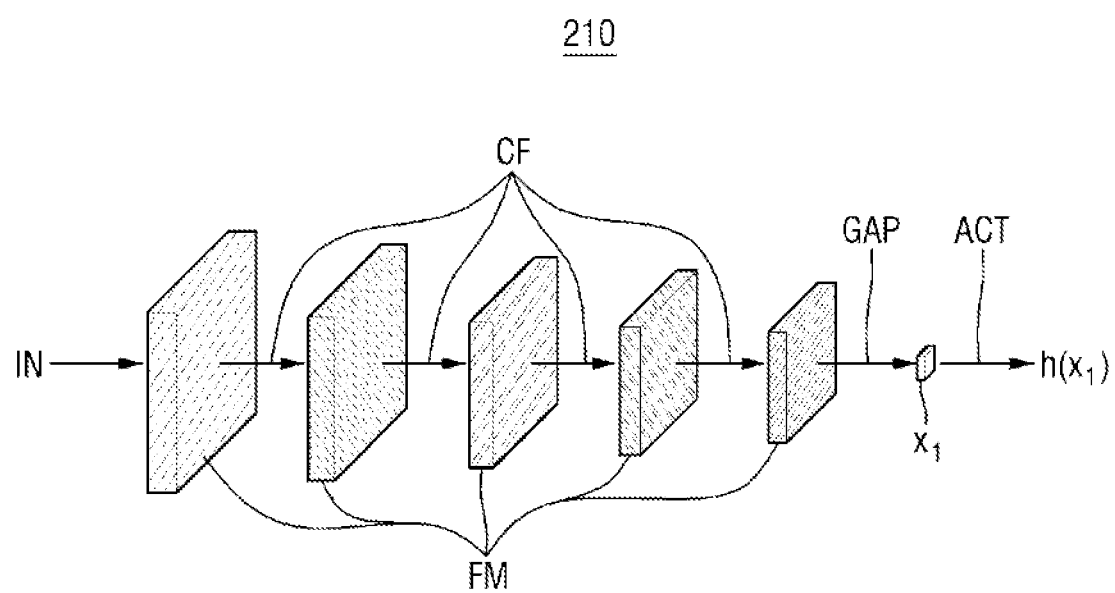
FIG. 4 is a diagram illustrating a first neural network of a determination unit according to an exemplary embodiment.
Figure 5:
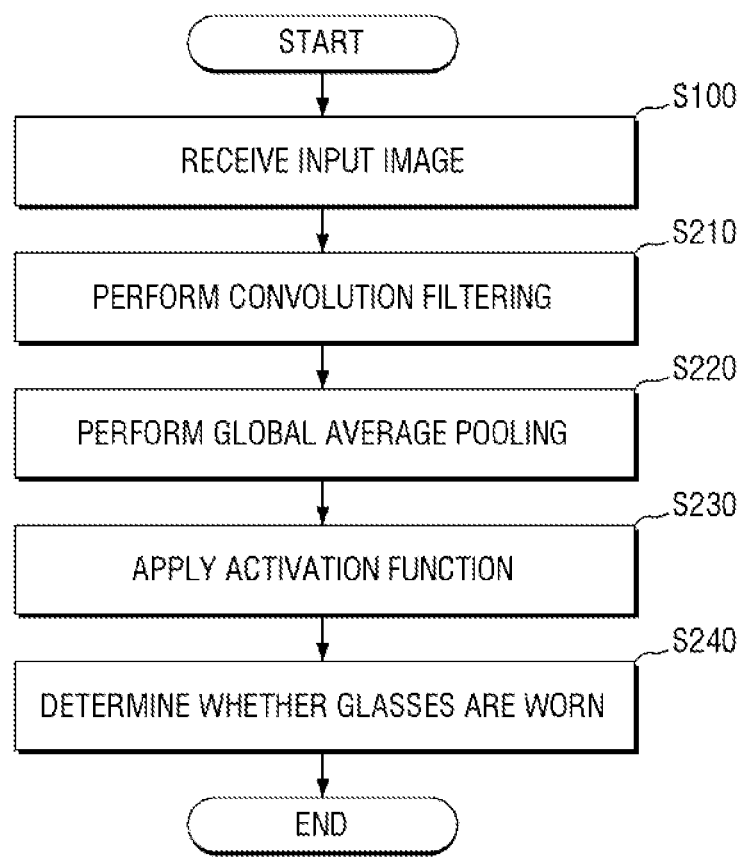
FIG. 5 is a flowchart illustrating a process of the determination unit of FIG. 4 of determining whether glasses are worn.

FIG. 4 is a diagram illustrating the first neural network of the determination unit according to an exemplary embodiment, and FIG. 5 is a flowchart illustrating a process of the determination unit of FIG. 4 of determining whether glasses are worn.

Referring to FIGS. 4 and 5, in operation S100, the determination unit 210 may receive an input image from the image inputter 100.

The determination unit 210 may include the first neural network including the plurality of filters. The first neural network may include first to third filters. For example, the first filter may be a convolution filter CF, the second filter may be a global average pooling filter GAP, and the third filter may be an activation function filter ACT. The first neural network may be implemented as a convolutional neural network, thereby implementing a complicated non-linear model and improving image processing or voice processing performance. For example, the plurality of filters may output meaningful information related to a pupil and positional information of the pupil by maintaining two-dimensional or three-dimensional data included in the input image without change.

In operation S210, the convolution filter CF may output a feature map FM by performing weighted convolution filtering on the input image. Here, the output feature map FM may correspond to image data in which various features of the input image are expressed. For example, the convolution filter CF may change a current pixel value by multiplying each of a plurality of pixels of input image data by a weight and adding up multiplication results. For example, image data with an m-by-n matrix structure (wherein m and n are natural numbers) may be filtered by a weight of a filter with a p-by-q matrix structure (wherein p is a natural number less than or equal to m and q is a natural number less than or equal to n). The convolution filter CF may perform a dot product of a filter weight and image data by sliding the filter weight over the image data. The convolution filter CF may perform the dot product while moving the filter weight on the image data at intervals determined by a stride. The convolution filter CF may have two or more strides, thereby reducing a size of the output feature map FM. Therefore, the convolution filter CF may output the feature map FM with a pattern with respect to a position of the input image. The pattern included in the feature map FM may be used as glasses-wearing information.

In operation S220, the global average pooling filter GAP may perform global average pooling by receiving the feature map FM output from the convolution filter CF. For example, the global average pooling filter GAP may calculate an average value by adding up all pixel values of the feature map. The global average pooling filter GAP may output feature data $x_1$ with a 1-by-1 size by performing global average pooling on the feature map FM with a j-by-k size (wherein j is a natural number of two or more and k is a natural number of two or more). The feature map output from the global average pooling filter GAP may include reliability with respect to target data. The global average pooling filter GAP may omit a feature of other information while maintaining glasses-wearing information. The global average pooling filter GAP may be formed of a single layer and may reduce the number of parameters of the first neural network to lighten the first neural network.

In operation S230, the activation function filter ACT may apply an activation function to output of the global average pooling filter GAP. For example, when the feature data $x_1$ output from the global average pooling filter GAP is close to one, the activation function filter ACT may output a value of 1 ($h(x_1)=1$). When the feature data $x_1$ is close to zero, the activation function filter ACT may output a value of 0 ($h(x_1)=0$). In addition, when the feature data $x_1$ includes glasses-wearing information, the activation function filter ACT may output a value of 1 ($h(x_1)=1$). When the feature data $x_1$ does not include the glasses-wearing information, the activation function filter ACT may output a value of 0 ($h(x_1)=0$). Therefore, the activation function filter ACT may change output of the global average pooling filter GAP into a non-linear value.

In operation S240, the determination unit 210 may determine whether a user of the input image wears glasses based on output of the activation function filter ACT. For example, when the determination unit 210 receives the value of 1 ($h(x_1)=1$) from the activation function filter ACT, the determination unit 210 may determine that the input image includes a person wearing glasses. When the determination unit 210 receives the value of 0 ($h(x_1)=0$) from the activation function filter ACT, the determination unit 210 may determine that the input image includes a person not wearing glasses. When the user wears the glasses, the determination unit 210 may provide a glasses-wearing signal to the generation unit 220. When the user does not wear the glasses, the determination unit 210 may provide a glasses-non-wearing signal to the detection unit 230.

Figure 6:
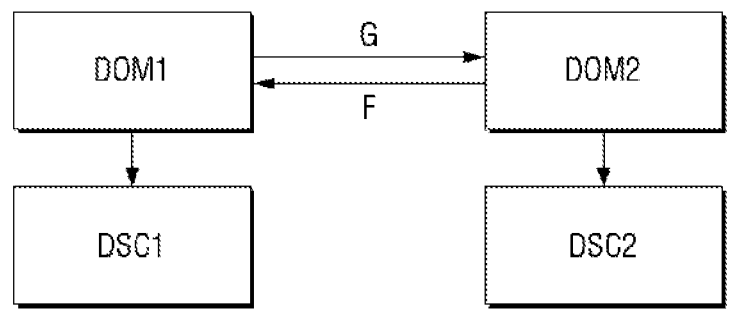
FIG. 6 is a diagram illustrating a generation unit of the detecting device according to an exemplary embodiment.
Figure 7:
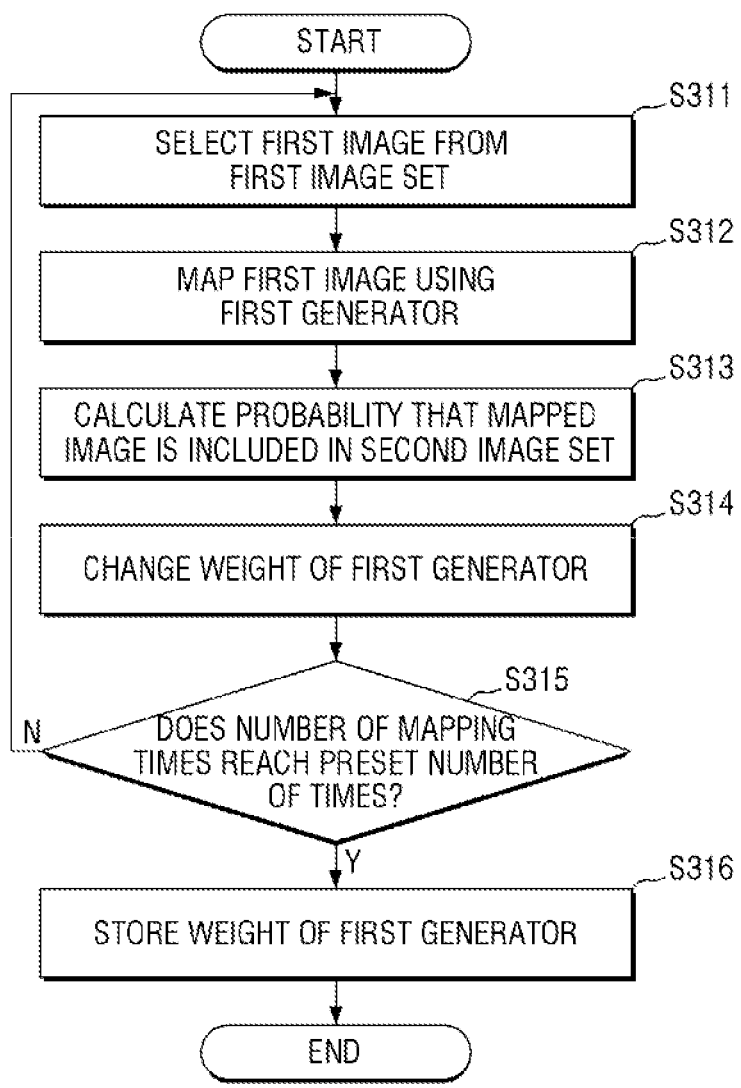
FIG. 7 is a flowchart illustrating a learning process of a first generator of the generation unit according to an exemplary embodiment.

FIG. 6 is a diagram illustrating the generation unit of the detecting device according to an exemplary embodiment, and FIG. 7 is a flowchart illustrating a learning process of a first generator of the generation unit according to an exemplary embodiment.

Referring to FIGS. 6 and 7, when the generation unit 220 receives a glasses-wearing signal from the determination unit 210, the generation unit 220 may generate a face image in which glasses are removed from an input image by using a learned generator.

The generation unit 220 may include a first image set DOM1, a second image set DOM2, a first generator G configured to map a first image selected from the first image set DOM1, and a second generator F configured to map a second image selected from the second image set DOM2. The generation unit 220 may further include a first function unit DSC1 configured to evaluate an image mapped by the first generator G and a second function unit DSC2 configured to evaluate an image mapped by the second generator F.

In operation S311, the generation unit 220 may learn a weight of the first generator G. The generation unit 220 may select a first image from the first image set DOM1. The first image set DOM1 may include images including a person wearing glasses.

In operation S312, the generation unit 220 may map the first image using the first generator G. The generation unit 220 may generate an image with a feature of the second image set DOM2 by mapping the first image of the first image set DOM1. For example, the generation unit 220 may generate an image in which the glasses are removed from the first image by removing the glasses from the first image using the first generator G. The first generator G may not change other feature information except for feature information about the glasses. The generation unit 220 may learn the weight of the first generator G until a difference between the mapped first image and the second image in the second image set DOM2 is minimized. Therefore, the first generator G may be learned to be adversarial to the first function unit DSC1.

In operation S313, the first function unit DSC1 may calculate a probability that the image mapped by the first generator G is included in the second image set DOM2. The first function unit DSC1 may analyze a difference between the mapped first image and the second image in the second image set DOM2. For example, the first function unit DSC1 may identify a difference between feature information of the mapped first image and feature information of the second image in the second image set DOM2. The generation unit 220 may learn a weight of the first function unit DSC1 until the difference between the mapped first image and the second image in the second image set DOM2 is maximized. Therefore, the first function unit DSC1 may be learned to be adversarial to the first generator G.

In operation S314, the generation unit 220 may change the weight of the first generator G based on the probability calculated by the first function unit DSC1. The weight of the first generator G may be changed so that the difference between the mapped first image and the second image in the second image set DOM2 is minimized. Additionally, the weight of the first function unit DSC1 may be changed so that the difference between the mapped first image and the second image in the second image set DOM2 is maximized. Therefore, the generation unit 220 may allow the first generator G to compete against the first function unit DSC1. The generation unit 220 may train the first generator G until the first function unit DSC1 cannot distinguish between the mapped first image and the second image in the second image set DOM2. For example, when the weight of the first generator G is learned, a probability that the first function unit DSC1 distinguishes between the mapped first image and the second image in the second image set DOM2 may be 50%.

In operation S315, the generation unit 220 may count a number of learning times of the weights of the first generator G and the first function unit DSC1. The generation unit 220 may then determine whether the number of learning times of the weights reaches a preset number of times.

When the number of learning times of the weights does not reach the preset number of times, the generation unit 220 may repeat learning of the first generator G and the first function unit DSC1. The generation unit 220 may change the weight of each of the first generator G and the first function unit DSC1 to repeat mapping using the first generator G and identifying using the first function unit DSC1.

In operation S316, the generation unit 220 may store the weights of the first generator G and the first function unit DSC1 when the number of learning times of the weights reaches the preset number. The stored weight of the first generator G may be used to remove glasses from a person wearing glasses in an input image.

Figure 8:
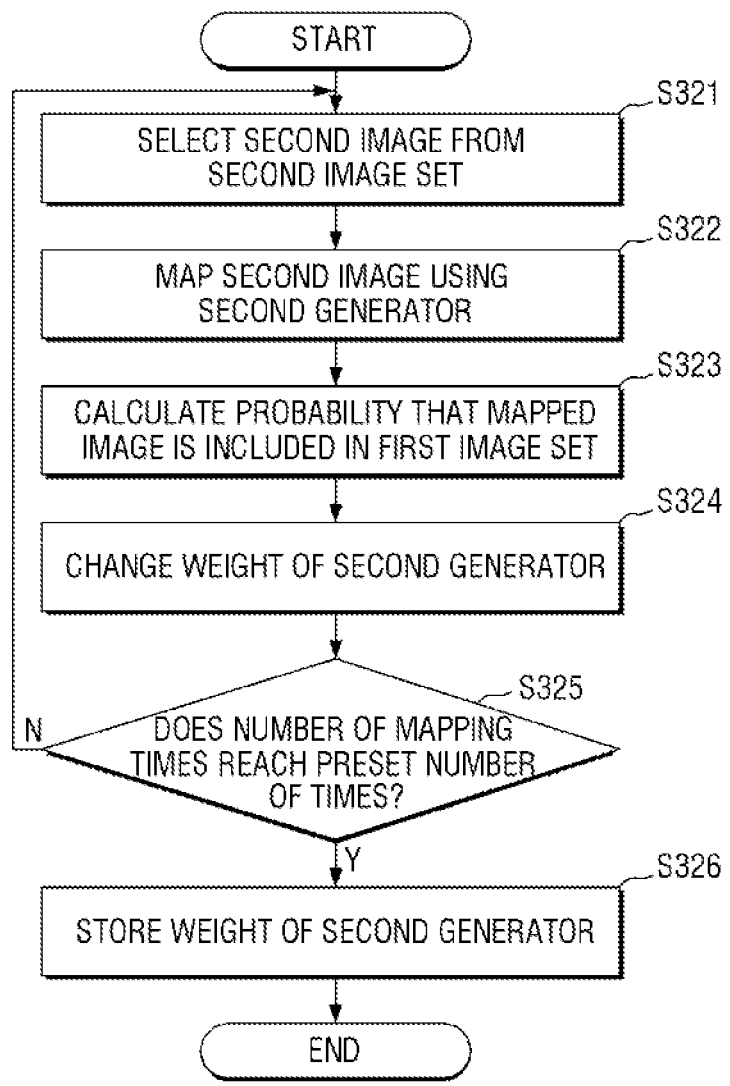
FIG. 8 is a flowchart illustrating a learning process of a second generator of the generation unit according to an exemplary embodiment.

FIG. 8 is a flowchart illustrating a learning process of the second generator of the generation unit according to an exemplary embodiment.

Referring to FIG. 8, the generation unit 220 may learn a weight of the second generator F. In operation S321, the generation unit 220 may select a second image from the second image set DOM2. The second image set DOM2 may include images including a person not wearing glasses.

In operation S322, the generation unit 220 may map the second image using the second generator F. The generation unit 220 may generate an image with a feature of the first image set DOM1 by mapping the second image of the second image set DOM2. For example, the generation unit 220 may add glasses in the second image using the second generator F to generate an image in which the glasses are added in the second image. The second generator F may not change other feature information except for feature information about the glasses. The generation unit 220 may learn the weight of the second generator F until a difference between the mapped second image and the first image in the first image set DOM1 is minimized. Therefore, the second generator F may be learned to be adversarial to the second function unit DSC2.

In operation S323, the second function unit DSC2 may calculate a probability that the image mapped by the second generator F is included in the first image set DOM1. The second function unit DSC2 may analyze a difference between the mapped second image and the first image in the first image set DOM1. For example, the second function unit DSC2 may identify a difference between feature information of the mapped second image and feature information of the first image in the first image set DOM1. The generation unit 220 may learn a weight of the second function unit DSC2 until the difference between the mapped second image and the first image in the first image set DOM1 is maximized. Therefore, the second function unit DSC2 may be learned to be adversarial to the second generator F.

In operation S324, the generation unit 220 may change the weight of the second generator F based on the probability calculated by the second function unit DSC2. The weight of the second generator F may be changed so that the difference between the mapped second image and the first image in the first image set DOM1 is minimized, and the weight of the second function unit DSC2 may be changed so that the difference between the mapped second image and the first image in the first image set DOM1 is maximized. Therefore, the generation unit 220 may allow the second generator F to compete against the second function unit DSC2. The generation unit 220 may train the second generator F until the second function unit DSC2 cannot distinguish between the mapped second image and the first image in the first image set DOM1. For example, when the weight of the second generator F is learned, a probability that the second function unit DSC2 distinguishes between the mapped second image and the first image in the first image set DOM1 may be 50%.

In operation S325, the generation unit 220 may count a number of learning times of the weights of the second generator F and the second function unit DSC2 and may determine whether the number of learning times of the weights reaches a preset number of times.

When the number of learning times of the weights does not reach the preset number of times, the generation unit 220 may repeat the learning of the second generator F and the second function unit DSC2. The generation unit 220 may change the weight of each of the second generator F and the second function unit DSC2 and may repeat mapping using the second generator F and identifying using the second function unit DSC2.

When the number of learning times of the weights reaches the preset number of times, the generation unit 220 may store the weights of the second generator F and the second function unit DSC2. The stored weight of the second generator F may be used to remove glasses on a person wearing glasses in the input image.

Figure 9:
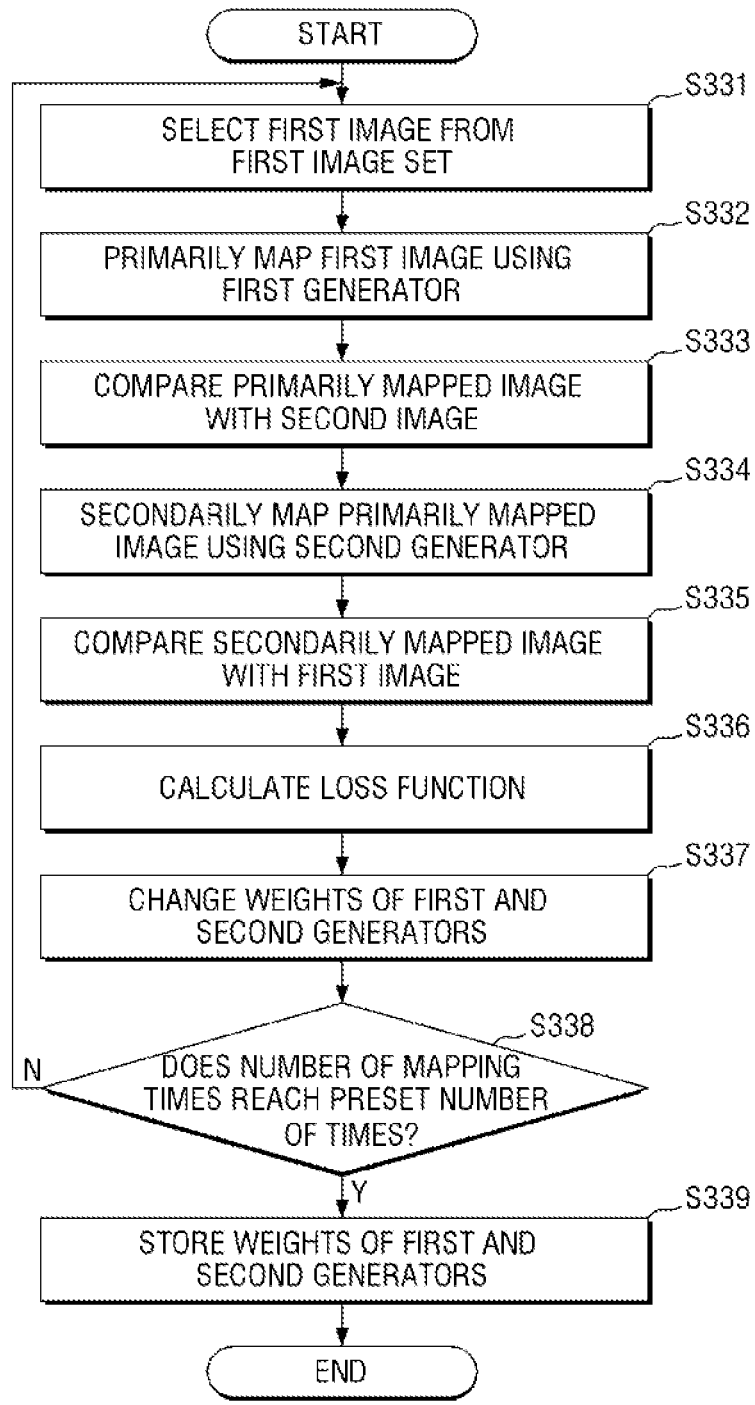
FIG. 9 is a flowchart illustrating an example of a learning process of the first and second generators of the generation unit according to an exemplary embodiment.

FIG. 9 is a flowchart illustrating an example of a learning process of the first and second generators of the generation unit according to an exemplary embodiment.

Referring to FIG. 9, the generation unit 220 may train the first and second generators G and F.

In operation S331, the generation unit 220 may select a first image from the first image set DOM1. The first image set DOM1 may include images including a person wearing glasses.

In operation S332, the generation unit 220 may primarily map the first image using the first generator G. The generation unit 220 may generate an image with a feature of the second image set DOM2 by primarily mapping the first image of the first image set DOM1. For example, the generation unit 220 may generate an image in which the glasses are removed from the first image by removing the glasses from the first image using the first generator G.

In operation S333, the first function unit DSC1 may compare the image primarily mapped by the first generator G with a second image in the second image set DOM2. The first function unit DSC1 may analyze a difference between the primarily mapped first image and the second image in the second image set DOM2. For example, the first function unit DSC1 may identify a difference between feature information of the primarily mapped first image and feature information of the second image in the second image set DOM2. The generation unit 220 may learn a weight of the first function unit DSC1 until the difference between the primarily mapped first image and the second image in the second image set DOM2 is maximized. Therefore, the first function unit DSC1 may be learned to be adversarial to the first generator G.

In operation S334, the generation unit 220 may secondarily map the primarily mapped image using the second generator F. The generation unit 220 may regenerate an image with an original feature by mapping the first image in the first image set DOM1 twice using the first and second generators G and F. For example, the generation unit 220 may remove the glasses from the first image through the primary mapping by the first generator G and may re-add the glasses to the image, from which the glasses are removed, through the secondary mapping by the second generator F.

In operation S335, the second function unit DSC2 may compare the image secondarily mapped by the second generator F with the first image in the first image set DOM1. The second function unit DSC2 may analyze a difference between the secondarily mapped image and the first image in the first image set DOM1. For example, the second function unit DSC2 may identify a difference between feature information of the secondarily mapped image and feature information of the first image in the first image set DOM1. The generation unit 220 may learn a weight of the second function unit DSC2 until the difference between the secondarily mapped image and the first image in the first image set DOM1 is maximized. Therefore, the second function unit DSC2 may be learned to be adversarial to the second generator F.

The generation unit 220 may primarily map a first image x using the first generator G and secondarily map the first image x using the second generator F and may compare an image $F(G(x))$, which is obtained by secondarily mapping the first image, with the first image x. In addition, the generation unit 220 may primarily map a second image y using the second generator F and secondarily map the second image y using the first generator G and may compare an image G(F(x)), which is obtained by secondarily mapping the second image, with the second image y.

In operation S336, the generation unit 220 may calculate a loss function Lcyc(G,F) on the basis of a comparison result between the image F(G(x)), which is obtained by secondarily mapping the first image. The first image x and on the basis of a comparison result between the image G(F(x)), which is obtained by secondarily mapping the second image, and the second image y. The loss function Lcyc(G,F) of the generation unit 220 may be defined as in Equation 1 below.

$$L_{cyc}(G,F) = \mathbb{E}_{x \sim P_{data}(x)}[\|F(G(x))-x\|_1] + \mathbb{E}_{y \sim P_{data}(y)}[\|G(F(y))-y\|_1]$$ [Equation 1]

Here, "$P_{data}(x)$" refers to the first image set DOM1, and "x" refers to the first image x selected from the first image set DOM1. "$\mathbb{E}_{x \sim P_{data}(x)}$" refers to an expected value calculated by extracting samples from a sample space formed by a probability distribution "$P_{data}$" with respect to a random variable "x". "G(x)" refers to output in which the first generator G primarily maps the first image x, and "F(G(x))" refers to output in which the second generator F secondarily maps the primarily mapped image. "$\mathbb{E}_{x \sim P_{data}(x)}[\|F(G(x))-x\|_1]$" refers to an expected value of a difference between the image F(G(x)), which is obtained by mapping the first image x twice through the first and second generators G and F, and the first image x.

"$P_{data}(y)$" refers to the second image set DOM2, and "y" refers to the second image y selected from the second image set DOM2. "$\mathbb{E}_{y \sim P_{data}(y)}$" refers to an expected value calculated by extracting samples from a sample space formed by a probability distribution "$P_{data}$" with respect to a random variable "y". "F(x)" refers to output in which the second generator F primarily maps the second image y, and "G(F(x))" refers to output in which the first generator G secondarily maps the primarily mapped image. Therefore, "$\mathbb{E}_{y \sim P_{data}(y)}[\|G(F(y))-y\|_1]$" refers to an expected value of a difference between the image F(G(x)), which is obtained by mapping the second image y twice through the second and first generators F and G, and the second image y.

In operation S337, the generation unit 220 may change weights of the first and second generators G and F and the first and second function units DSC1 and DSC2 based on the calculated loss function.

Accordingly, the generation unit 220 may calculate the loss function Lcyc(G, F) by adding up the expected value of the difference between the image F(G(x)), which is obtained by mapping the first image x twice through the first and second generators G and F, and the first image x and the expected value of the difference between the image G(F(y)), which is obtained by mapping the second image y twice through the second and first generators F and G, and the second image y. The generation unit 220 may not significantly change an image mapped by each of the first and second generators G and F since original feature information should be included without change by mapping the first image x twice. The generation unit 220 may not significantly change an image mapped by each of the second and first generators F and G, since original feature information should be included without change by mapping the second image y twice. As a result, the generation unit 220 may accurately learn a weight through cycle consistency of the first and second generators G and F and may increase mapping performance with respect to various input images.

In operation S338, the generation unit 220 may count a number of learning times of the weights of the first and second generators G and F and may determine whether the number of learning times of the weights reaches a preset number of times.

When the number of learning times of the weights does not reach the preset number of times, the generation unit 220 may repeat learning of the first and second generators G and F. The generation unit 220 may repeat processes of mapping the first image using the first and second generators G and F and mapping the second image using the second and first generators F and G.

In operation S339, when the number of learning times of the weights reaches the preset number of times, the generation unit 220 may store the weights of the first and second generators G and F. The stored weight of the first generator G may be used to remove glasses on a person wearing glasses in an input image.

Figure 10:
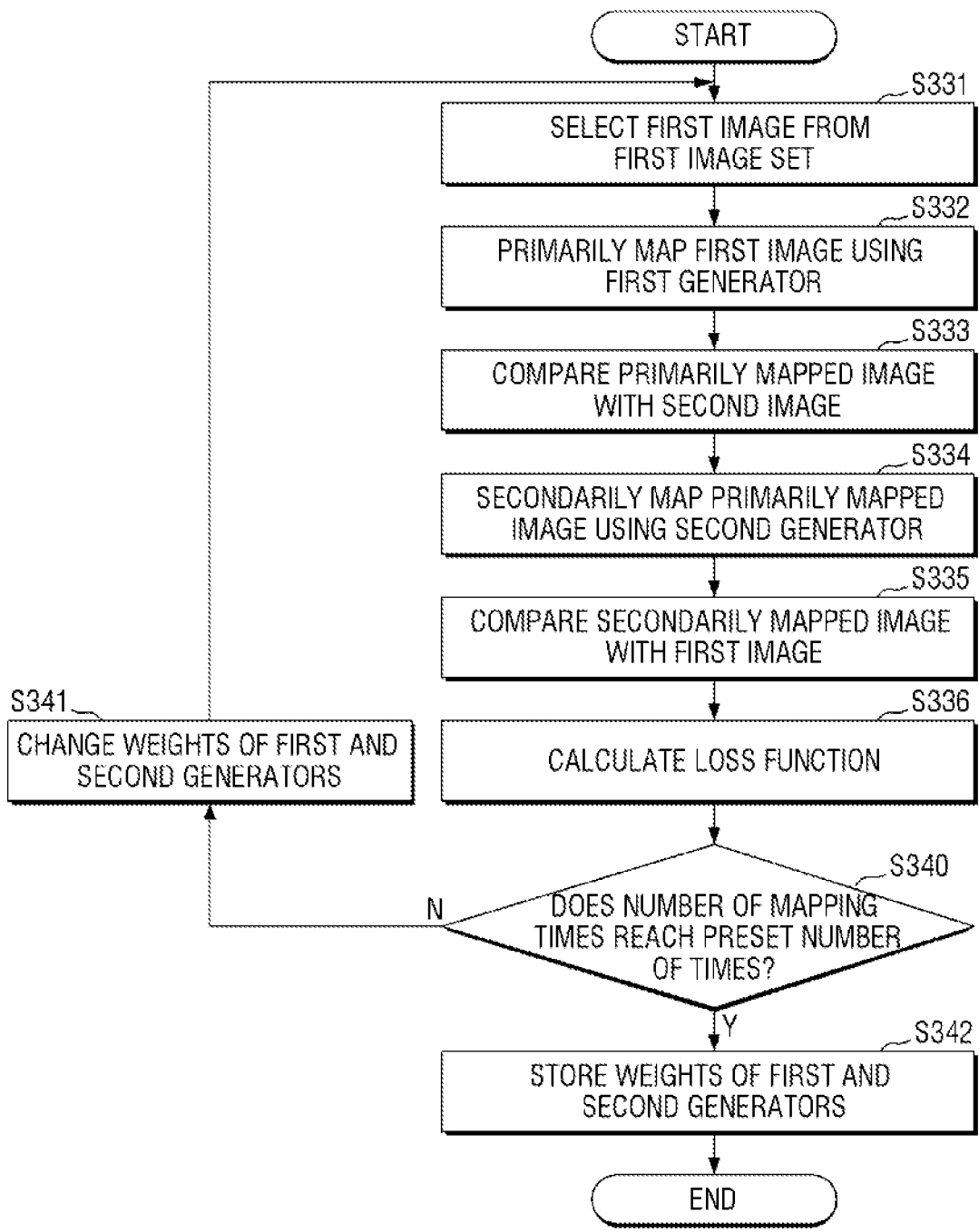
FIG. 10 is a flowchart illustrating another example of a learning process of the first and second generators of the generation unit according to an exemplary embodiment.

FIG. 10 is a flowchart illustrating another example of a learning process of the first and second generators of the generation unit according to an exemplary embodiment. A process of learning a weight of FIG. 10 differs from a process of learning a weight of FIG. 9 in operations following operation S336. Hereinafter, the same components as those described above will be briefly described or omitted.

Referring to FIG. 10, in operation S331, the generation unit 220 may select a first image from the first image set DOM1. The first image set DOM1 may include images including a person wearing glasses.

In operation S332, the generation unit 220 may primarily map the first image using the first generator G.

In operation S333, the first function unit DSC1 may compare the image primarily mapped by the first generator G with a second image in the second image set DOM2.

In operation S334, the generation unit 220 may secondarily map the primarily mapped image using the second generator F.

In operation S335, the second function unit DSC2 may compare the image secondarily mapped by the second generator F with the first image in the first image set DOM1.

In operation S336, the generation unit 220 calculate a loss function Lcyc(G,F) based on a comparison result between an image F(G(x)), which is obtained by secondarily mapping the first image, and the first image x and based on a comparison result between an image G(F(y)), which is obtained by primarily mapping the second image, and the second image y.

In operation S340, the generation unit 220 may determine whether the calculated loss function Lcyc(G,F) is less than or equal to a preset value.

In operation S341, the generation unit 220 may change weights of the first and second generators G and F to repeat a learning process when the loss function Lcyc(G,F) exceeds the preset value.

When the loss function Lcyc(G,F) is less than or equal to the preset value, the generation unit 220 may store the weights of the first and second generators G and F. The stored weight of the first generator G may be used to remove glasses from a person wearing glasses in an input image.

Figure 11:
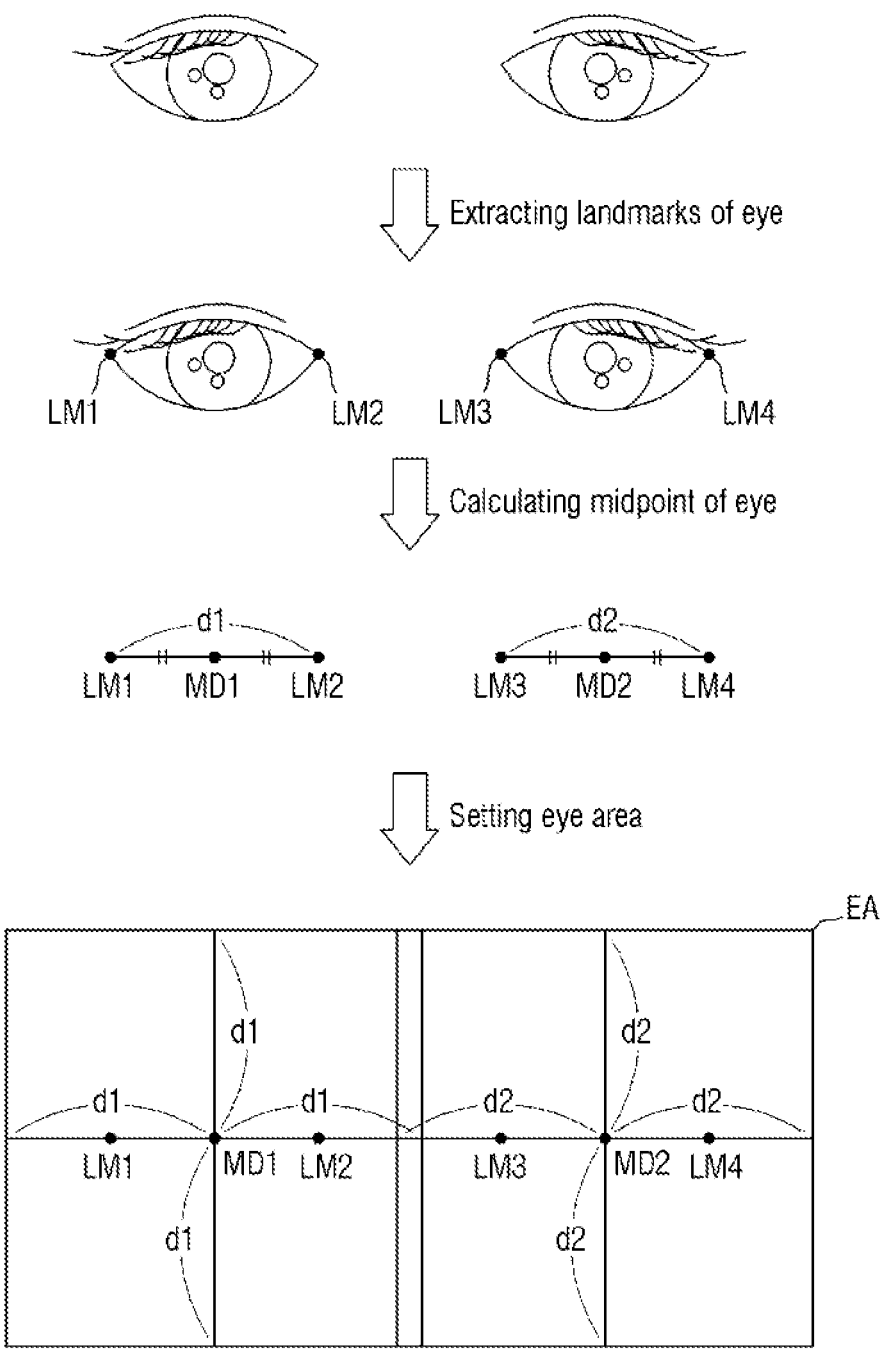
FIG. 11 is a diagram illustrating a process of setting an eye area of a detection unit according to an exemplary embodiment.
Figure 12:
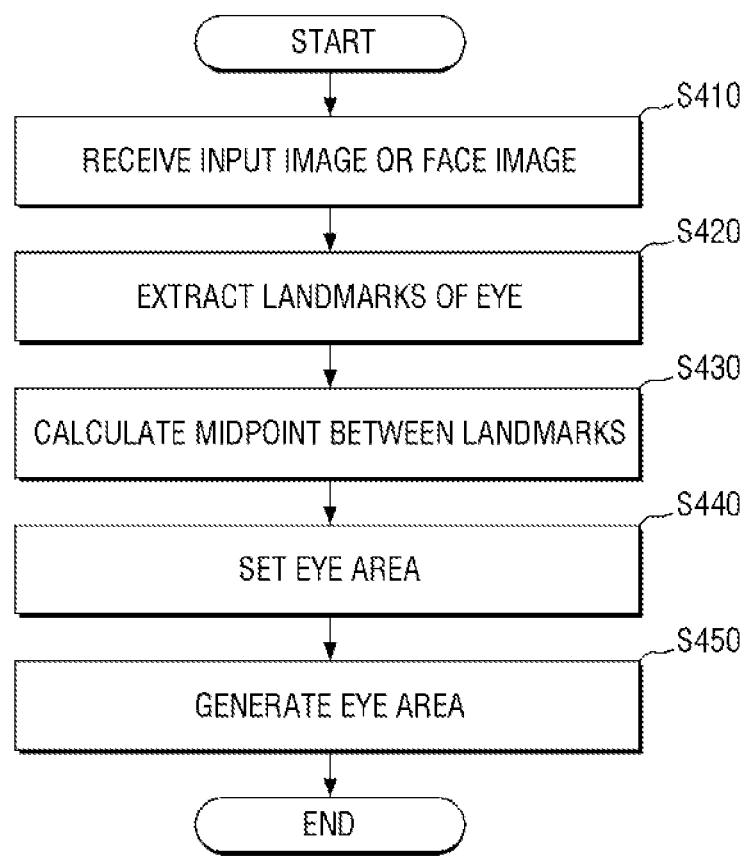
FIG. 12 is a flowchart illustrating the process of generating the eye area of the detection unit according to an exemplary embodiment.

FIG. 11 is a diagram illustrating a process of setting an eye area of the detection unit according to an exemplary embodiment, and FIG. 12 is a flowchart illustrating the process of generating the eye area of the detection unit according to an exemplary embodiment.

Referring to FIGS. 11 and 12, the detection unit 230 may generate the eye image by receiving an input image or a face image.

In operation S410, the detection unit 230 may receive the input image or the face image. For example, when a user of the input image wears glasses, the detection unit 230 may receive a face image from which the glasses are removed from the generation unit 220. When the user does not wear the glasses, the detection unit 230 may receive an input image from the image inputter 100.

In operation S420, the detection unit 230 may extract landmarks of an eye from the input image or the face image. For example, the detection unit 230 may set first and second landmarks LM1 and LM2 of a left eye and set third and fourth landmarks LM3 and LM4 of a right eye from the input image or the face image. For example, the first to fourth landmarks LM1 to LM4 may correspond to left and right ends of both eyes, but the present disclosure is not necessarily limited thereto.

In operation S430, the detection unit 230 may calculate a midpoint between the landmarks of the eye. For example, the detection unit 230 may calculate a first midpoint MD1 between the first landmark LM1 and the second landmark LM2 of the left eye. The detection unit 230 may also calculate a second midpoint MD2 between the third landmark LM3 and the fourth landmark LM4 of the right eye.

In operation S440, the detection unit 230 may set an eye area EA based on an arrangement of the landmarks of the eye. For example, the detection unit 230 may measure a distance d1 between the first landmark LM1 and the second landmark LM2 of the left eye. The detection unit 230 may set the eye area EA that extends by the distance d1 between the first landmark LM1 and the second landmark LM2 in each of a first horizontal direction and a second horizontal direction with respect to the first midpoint MD1 between the first landmark LM1 and the second landmark LM2. The detection unit 230 may measure a distance d2 between the third landmark LM3 and the fourth landmark LM4 of the right eye. The detection unit 230 may set the eye area EA that extends by the distance d2 between the third landmark LM3 and the fourth landmark LM4 in each of the first horizontal direction and the second horizontal direction with respect to the second midpoint MD2 between the third landmark LM3 and the fourth landmark LM4. The eye area EA may be set by merging an area formed from the first midpoint MD1 and an area formed from the second midpoint MD2.

In operation S450, the detection unit 230 may generate an eye image EI including the eye area EA from the input image or the face image.

Figure 13:
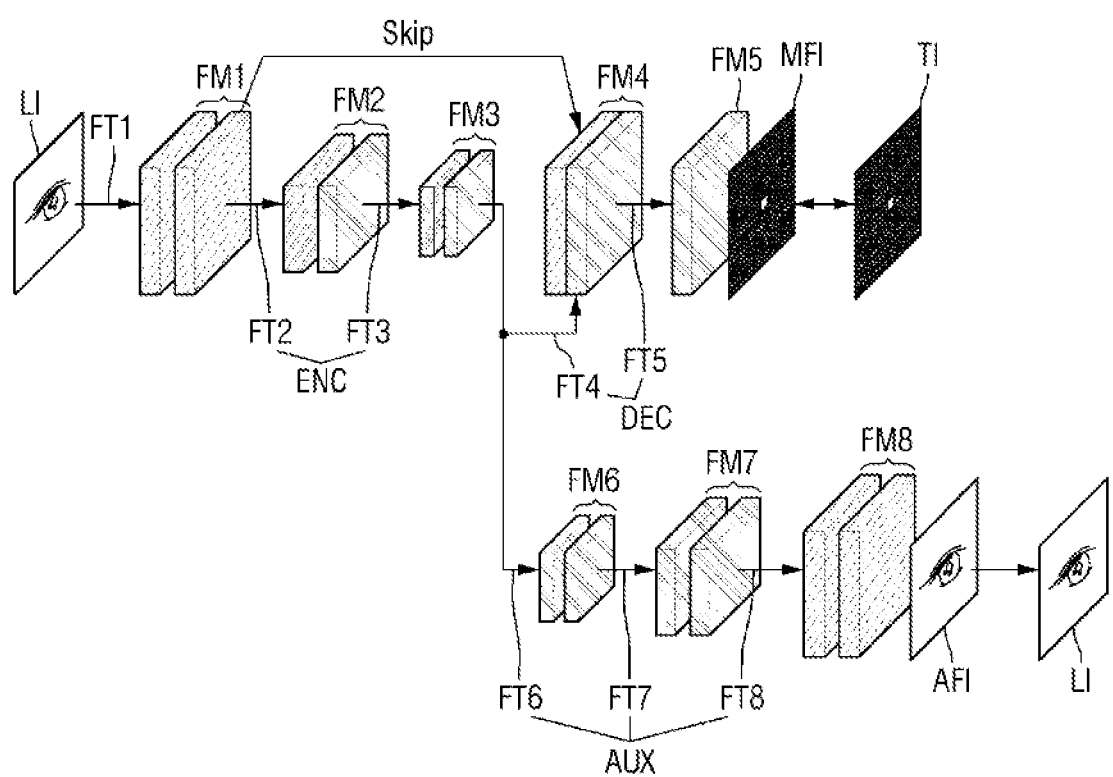
FIG. 13 is a diagram illustrating a second neural network of the detection unit according to an exemplary embodiment.
Figure 14:
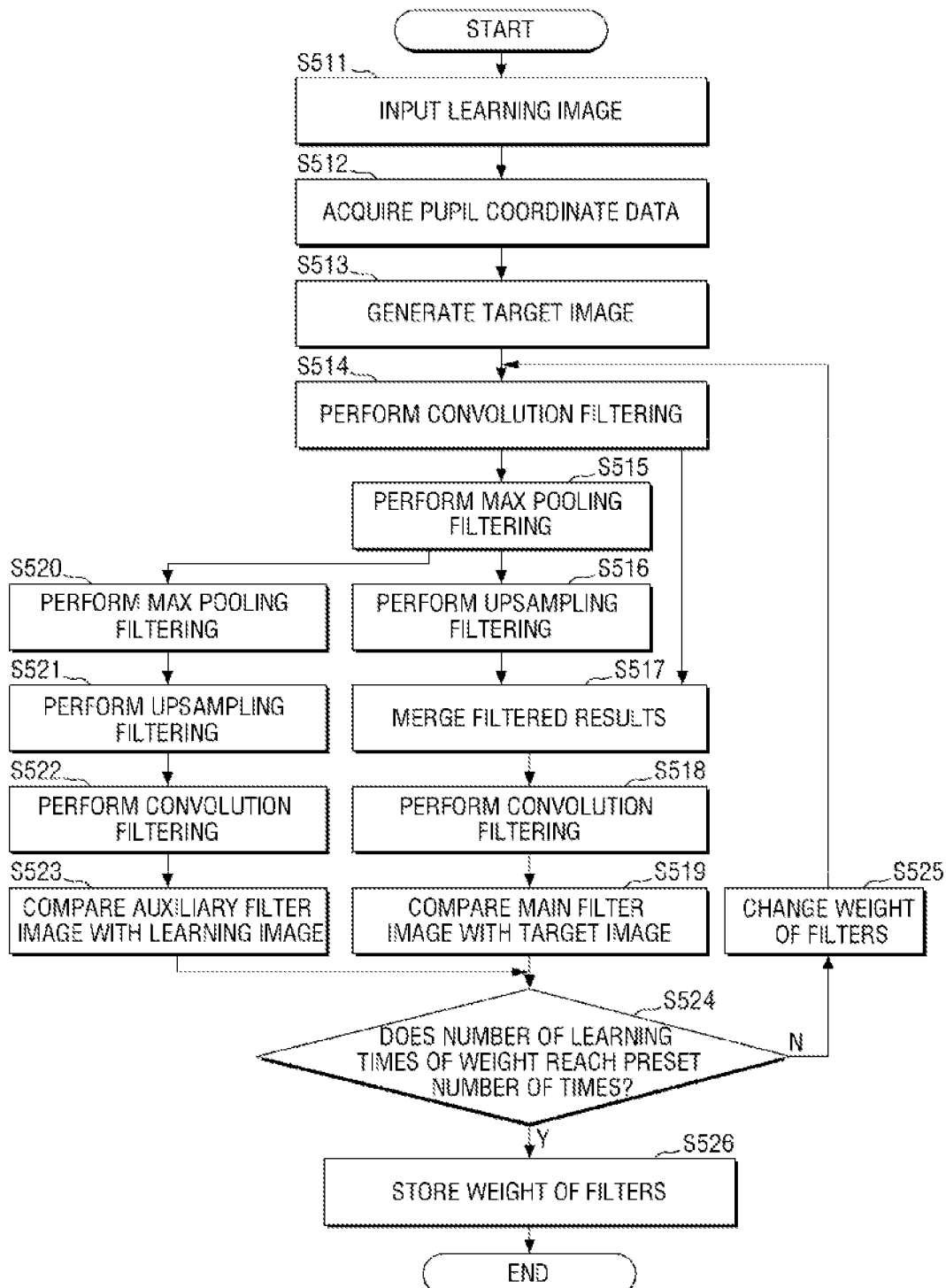
FIG. 14 is a flowchart illustrating an example of a process of learning a weight of the second neural network of FIG. 13.

FIG. 13 is a diagram illustrating a second neural network of the detection unit according to an exemplary embodiment, and FIG. 14 is a flowchart illustrating an example of a process of learning a weight of the second neural network of FIG. 13.

Referring to FIGS. 13 and 14, the detection unit 230 may detect two-dimensional pupil coordinates from an eye image EI using the second neural network including a plurality of filters.

The detection unit 230 may learn a weight of the second neural network. The detection unit 230 may receive a learning image LI and may generate a target image TI based on pupil coordinate data acquired from the learning image LI. The detection unit 230 may filter the learning image LI using a plurality of filters FT1 to FT8 of the second neural network. To allow a main filter image MFI obtained by filtering the learning image LI to be similar to the target image TI, the detection unit 230 may learn weights of the plurality of filters FT1 to FT8 of the second neural network. For example, the detection unit 230 may learn the weights of the plurality of filters FT1 to FT8 by repeating a filtering process a preset number of times. In another example, the detection unit 230 may learn the weights of the plurality of filters FT1 to FT8 by repeating the filtering process until a loss function calculated based on the main filter image MFI, the target image TI, an auxiliary filter image AFI, and the learning image LI is less than or equal to a preset value. When weight learning is completed, the detection unit 230 may store the weight of each of the plurality of filters FT1 to FT8 of the second neural network.

In operation S511, the detection unit 230 may receive the learning image LI. Here, the learning image LI may include various images including meaningful information related to a pupil (for example, spatial information of the pupil) or positional information of the pupil. The detection unit 230 may increase the accuracy of weight learning of the plurality of filters FT1 to FT8. The detecting device 10 may also increase the performance of detecting pupil coordinates from various input images, since the learning image LI includes various images.

In operation S512, the detection unit 230 may acquire the pupil coordinate data from the learning image LI. Here, the pupil coordinate data may correspond to coordinate data of a pixel coinciding with a pupil center among a plurality of pixels of a pupil area. The detection unit 230 may acquire the pupil coordinate data by labeling the learning image LI. For example, a user may label the learning image LI by selecting or designating a pupil center in the learning image LI.

In operation S513, the detection unit 230 may generate the target image TI based on the pupil coordinate data acquired from the learning image LI. The detection unit 230 may expand the pupil coordinate data from the pupil center to a certain range. For example, a pixel value of an expanded range may be the same as a pixel value of the pupil center. Therefore, a pixel within the expanded range among the pupil area may have a maximum pixel value (for example, a pixel value of 255).

The detection unit 230 may generate the target image TI by performing Gaussian filtering on the expanded pupil coordinate data. For example, the target image TI may have a maximum pixel value (for example, a pixel value of 255) at the pupil center through the Gaussian filtering. A pixel value may be decreased as a distance from the pupil center is increased. The target image TI may include meaningful information related to the pupil (for example, spatial information of the pupil) based on a distribution area of the expanded pupil coordinate data and the maximum pixel value.

The plurality of filters FT1 to FT8 may include first to eighth filters FT1 to FT8, and each of the first to eighth filters FT1 to FT8 may be implemented as a filter of a convolution filter, a max-pooling filter, and an upsampling filter. For example, the detecting device 10 may include a plurality of filters including at least one convolutional filter, at least one max-pooling filter, and at least one upsampling filter, thereby implementing a convolutional neural network. The plurality of filters FT1 to FT8 may be implemented as convolutional neural networks, thereby implementing a complicated nonlinear model and improving image processing or voice processing performance. For example, the plurality of filters may output meaningful information related to a pupil and positional information of the pupil by maintaining two-dimensional or three-dimensional data included in an input image without change.

Hereinafter, exemplary embodiments will be mainly described in which the first and fifth filters FT1 and FT5 are implemented as convolution filters, the second, third, and sixth filters FT2, FT3 and FT6 are implemented as max-pooling filters, and the fourth, seventh, and eighth filters FT4, FT7, and FT8 are implemented as upsampling filters. However, the configuration of the plurality of filters is not limited to the exemplary embodiments.

Each of the first and fifth filters FT1 and FT5 may be implemented as the convolution filter. Therefore, a feature map may be output by performing weighted convolution filtering on an input image or an input feature map. For example, the first and fifth filters FT1 and FT5 may change a current pixel value by multiplying each of a plurality of pixels of input image data by a weight and adding up multiplication results. Each of the first and fifth filters FT1 and FT5 may perform a dot product of a filter weight and image data by sliding the filter weight over the image data. Accordingly, the first and fifth filters FT1 and FT5 may output a feature map with a pattern with respect to a position of the input image or the input feature map. The pattern included in the feature map may be used as meaningful information related to a pupil or positional information of the pupil.

Each of the second, third, and sixth filters FT2, FT3, and FT6 may be implemented as the max-pooling filter. Therefore, a main pixel value may be extracted from the input feature map to output a feature map with a small size. For example, each of the second, third, and sixth filters FT2, FT3, and FT6 may extract a maximum pixel value for each of a plurality of partial areas of the input feature map and remove the remaining pixel values, thereby reducing the size of a feature map. Accordingly, the second, third and sixth filters FT2, FT3, and FT6 may prevent a local minor change in pixel value of the feature map from affecting output data.

Each of the fourth, seventh, and eighth filters FT4, FT7, and FT8 may be implemented as the upsampling filter. Therefore, upsampling may be performed on a max-pooling result. The fourth filter FT4 may increase the size of the feature map reduced by the second and third filters FT2 and FT3 by as much as a size corresponding to the input image. For example, the fourth filter FT4 may restore the feature map by storing a position of a pixel value before the feature map passes through the second filter FT2. Pixel values removed by the second and third filters FT2 and FT3 may not be restored again by the fourth filter FT4.

The seventh and eighth filters FT7 and FT8 may increase the size of the feature map reduced by the second, third and sixth filters FT2, FT3 and FT6 by as much as the size corresponding to the input image. For example, the seventh and eighth filters FT7 and FT8 may restore the feature map by storing a position of a pixel value before the feature map passes through the second filter FT2. Pixel values removed by the second, third, and sixth filters FT2, FT3, and FT6 may not be restored again by the seventh and eighth filters FT7 and FT8.

In another example, the fourth, seventh, and eighth filters FT4, FT7, and FT8 may perform upsampling through deconvolution.

In operation S514, the detection unit 230 may perform convolutional filtering on the learning image LI using the first filter FT1. For example, the first filter FT1 may output a first feature map FM1 by multiplying each of a plurality of pixels of the learning image LI by a weight and then adding up multiplication results. The first filter FT1 may perform a dot product of a filter weight and image data by sliding the filter weight over the image data.

In operation S515, the detection unit 230 may perform max-pooling filtering on the first feature map FM1 using an encoder ENC. The encoder ENC may include the second and third filters FT2 and FT3.

The detection unit 230 may perform max-pooling filtering on the first feature map FM1 using the second filter FT2. The second filter FT2 may extract a main pixel value from the first feature map FM1 to output a second feature map FM2 with a small size. For example, the second filter FT2 may extract a maximum pixel value for each of a plurality of partial areas of the first feature map FM1 and remove the remaining pixel values, thereby reducing the size of the second feature map FM2.

The detection unit 230 may perform max-pooling filtering on the second feature map FM2 using the third filter FT3. The third filter FT3 may extract a main pixel value from the second feature map FM2 to output a third feature map FM3 with a small size. For example, the third filter FT3 may extract a maximum pixel value for each of a plurality of partial areas of the second feature map FM2 and remove the remaining pixel values, thereby reducing the size of the third feature map FM3.

The detection unit 230 may perform deconvolution filtering on a feature map filtered by the encoder ENC using a decoder DEC. For example, the decoder DEC may have a weight corresponding to the encoder ENC. The decoder DEC may crop a feature map input to the encoder ENC to determine a weight of deconvolution filtering. Output of the decoder DEC may be the same size as the feature map (for example, the first feature map FM1) input to the encoder ENC and may also include meaningful information related to a pupil included in the first feature map FM1. In another example, the weight of the decoder DEC may be formed of a parameter set different from the weight of the encoder ENC. The decoder DEC may include fourth and fifth filters FT4 and FT5.

In operation S516, the detection unit 230 may perform upsampling filtering on the third feature map FM3 using the fourth filter FT4. The fourth filter FT4 may increase the size of the third feature map FM3 reduced by the encoder ENC by as much as a size corresponding to the learning image LI. For example, the fourth filter FT4 may store a position of a pixel value before the first feature map FM1 passes through the encoder ENC so as to be reflected on the fourth feature map FM4.

The detection unit 230 may include a skip connection network Skip which connects the feature map input to the encoder ENC to a feature map in which upsampling filtering is performed on output of the encoder ENC. The skip connection network Skip may transfer data input to the encoder ENC to the output of the encoder ENC without change. For example, the first feature map FM1 may be subjected to max-pooling filtering by the encoder ENC and then may be subjected to upsampling filtering by the fourth filter FT4. In addition, the first feature map FM1 may be transferred along the skip connection network Skip. Therefore, a filtering process by the encoder ENC may be omitted and the first feature map FM1 may be merged with output of the fourth filter FT4. In addition to meaningful information related to a pupil of the first feature map FM1 or positional information of the pupil, the skip connection network Skip may provide detailed information or additional information of the first feature map FM1 to the decoder DEC.

In operation S517, the detection unit 230 may merge a filtering result of the fourth filter FT4 and a filtering result of the first filter FT1. The detection unit 230 may generate the fourth feature map FM4 by merging a feature map output from the fourth filter FT4 and the first feature map FM1 transferred by the skip connection network Skip. For example, the feature map output from the fourth filter FT4 may include main information of the learning image LI, and the first feature map FM1 may include both of the main information and additional information of the learning image LI. Therefore, the detection unit 230 may include the skip connection network Skip to prevent an error that may occur according to detailed information or additional information removed by the encoder ENC. In addition, the detection unit 230 may include the skip connection network Skip to appropriately adjust the weights of the first to eighth filters FT1 to FT8, thereby improving weight learning efficiency.

In operation S518, the detection unit 230 may perform convolution filtering on the fourth feature map FM4 using the fifth filter FT5. For example, the fifth filter FT5 may output a fifth feature map FM5 by multiplying each of a plurality of pixels of the fourth feature map FM4 by a weight and then adding up multiplication results. The fifth filter FT5 may perform a dot product of a filter weight and the fourth feature map FM4 by sliding the filter weight over the fourth feature map FM4. The detection unit 230 may generate the main filter image MFI based on the fifth feature map FM5.

In operation S519, the detection unit 230 may compare the main filter image MFI with the target image TI. A difference between the main filter image MFI and the target image TI may be used to change the weights of the first to eighth filters FT1 to FT8.

The detection unit 230 may perform deconvolution filtering on the feature map filtered by the encoder ENC using the auxiliary filter AUX. The auxiliary filter AUX may be connected to the encoder ENC to perform a function of an auto encoder. The detection unit 230 may further include the auxiliary filter AUX to reproduce the auxiliary filter image AFI similar to the learning image LI. The auto encoder may extract various features of the learning image LI while compressing data of the learning image LI and may reproduce the auxiliary filter image AFI maximally similar to the learning image LI based on the extracted various features. The auto encoder may supplement accuracy of weight learning in a convolutional neural network including the encoder ENC and the decoder DEC. Accordingly, the detection unit 230 compares the auxiliary filter image AFI output by the encoder ENC and the auxiliary filter AUX with the learning image LI, thereby improving rapidity and accuracy of a process in which the main filter image MFI reaches the target image TI. The auxiliary filter AUX may include sixth to eighth filters FT6 to FT8.

In operation S520, the detection unit 230 may perform max-pooling filtering on the third feature map FM3 using the sixth filter FT6. The sixth filter FT6 may extract a main pixel value from the third feature map FM3 to output a sixth feature map FM6 with a small size. For example, the sixth filter FT6 may extract a maximum pixel value for each of a plurality of partial areas of the third feature map FM3 and remove the remaining pixel values, thereby reducing the size of the sixth feature map FM6.

In operation S521, the detection unit 230 may perform upsampling filtering on the sixth feature map FM6 using the seventh and eighth filters FT7 and FT8. The detection unit 230 may generate the auxiliary filter image AFI based on an eighth feature map FM8 upsampled and filtered by the seventh and eighth filters FT7 and FT8.

The detection unit 230 may perform upsampling filtering on the sixth feature map FM6 using the seventh filter FT7 to output a seventh feature map FM7. The detection unit 230 may perform upsampling filtering on the seventh feature map FM7 using the eighth filter FT8 to output the eighth feature map FM8. The seventh and eighth filters FT7 and FT8 may increase the size of the sixth feature map FM6 reduced by the encoder ENC and the sixth filter FT6 by as much as the size corresponding to the learning image LI. For example, the seventh and eighth filters FT7 and FT8 may store a position of a pixel value before the first feature map FM1 passes through the encoder ENC so as to be reflected on the eighth feature map FM8.

In operation S522, the detection unit 230 may perform convolution filtering on the eighth feature map FM8 to generate the auxiliary filter image AFI. For example, the detection unit 230 may perform a dot product of a filter weight and the eighth feature map FM8 by sliding a convolution filter over the eighth feature map FM8.

In operation S523, the detection unit 230 may compare the auxiliary filter image AFI with the learning image LI. A difference between the auxiliary filter image AFI and the learning image LI may be used to change the weights of the first to eighth filters FT1 to FT8.

In operation S524, the detection unit 230 may count a number of learning times of weights using the first to eighth filters FT1 to FT8 and may determine whether the number of learning times of the weights reaches a preset number of times.

In operation S525, the detection unit 230 may change the weights of the first to eighth filters FT1 to FT8 to repeat a filtering process using the first to eighth filters FT1 to FT8 when the number of learning times of the weights does not reach the preset number of times. The detection unit 230 may calculate a loss function Loss based on the target image TI, the main filter image MFI, the learning image LI, and the auxiliary filter image AFI. The detection unit 230 may change the weights of the first to eighth filters FT1 to FT8 based on the calculated loss function Loss. For example, the loss function Loss may be defined as in Equation 2 below.

$$\text{Loss} = \mathbb{E}_{x \sim P_{data}(x)}[\|y - \hat{y}(x)\|_2] + \mathbb{E}_{x \sim P_{data}(x)}[\|x - \tilde{y}\|_2] \qquad \text{[Equation 2]}$$

Here, "x" refers to the learning image LI, and "Pdata(x)" refers to a learning data set. "$\mathbb{E}_{x \sim P_{data}(x)}$" refers to an expected value calculated by extracting samples from a sample space formed by a probability distribution "Pdata" with respect to a random variable "x", "y" refers to the target image TI, "$\hat{y}$" refers to the main filter image MFI, and "$\tilde{y}$" refers to the auxiliary filter image AFI.

Accordingly, the detection unit 230 may calculate the loss function Loss by adding up an expected value with respect to a distance between a pupil center with respect to the target image TI and a pupil center with respect to the main filter image MFI and an expected value with respect to a distance between a pupil center with respect to the learning image LI and a pupil center with respect to the auxiliary filter image AFI. The detection unit 230 may change the weights of the first to eighth filters FT1 to FT8 based on the loss function Loss calculated based on the target image TI, the main filter image MFI, the learning image LI, and the auxiliary filter image AFI. Therefore, as a number of learning times is increased, accuracy of the weights of the first to eighth filters FT1 to FT8 may be increased. Even when a relatively small number of learning times of a weight is performed, accuracies of the weight may be increased, since the detection unit 230 includes the first to eighth filters FT1 to FT8.

As a result, the detection unit 230 may include the encoder ENC, the decoder DEC, the skip connection network Skip, and the auxiliary filter AUX, thereby accurately learning weights of a plurality of filters and removing false detection with respect to various input images to increase detection performance.

In operation S526, the detection unit 230 may store the weights of the first to eighth filters FT1 to FT8 when the number of learning times of the weights using the first to eighth filters FT1 to FT8 reaches the preset number of times. The stored weights of the first to eighth filters FT1 to FT8 may be used to generate a pupil area segmentation image based on an eye image.

Figure 15:
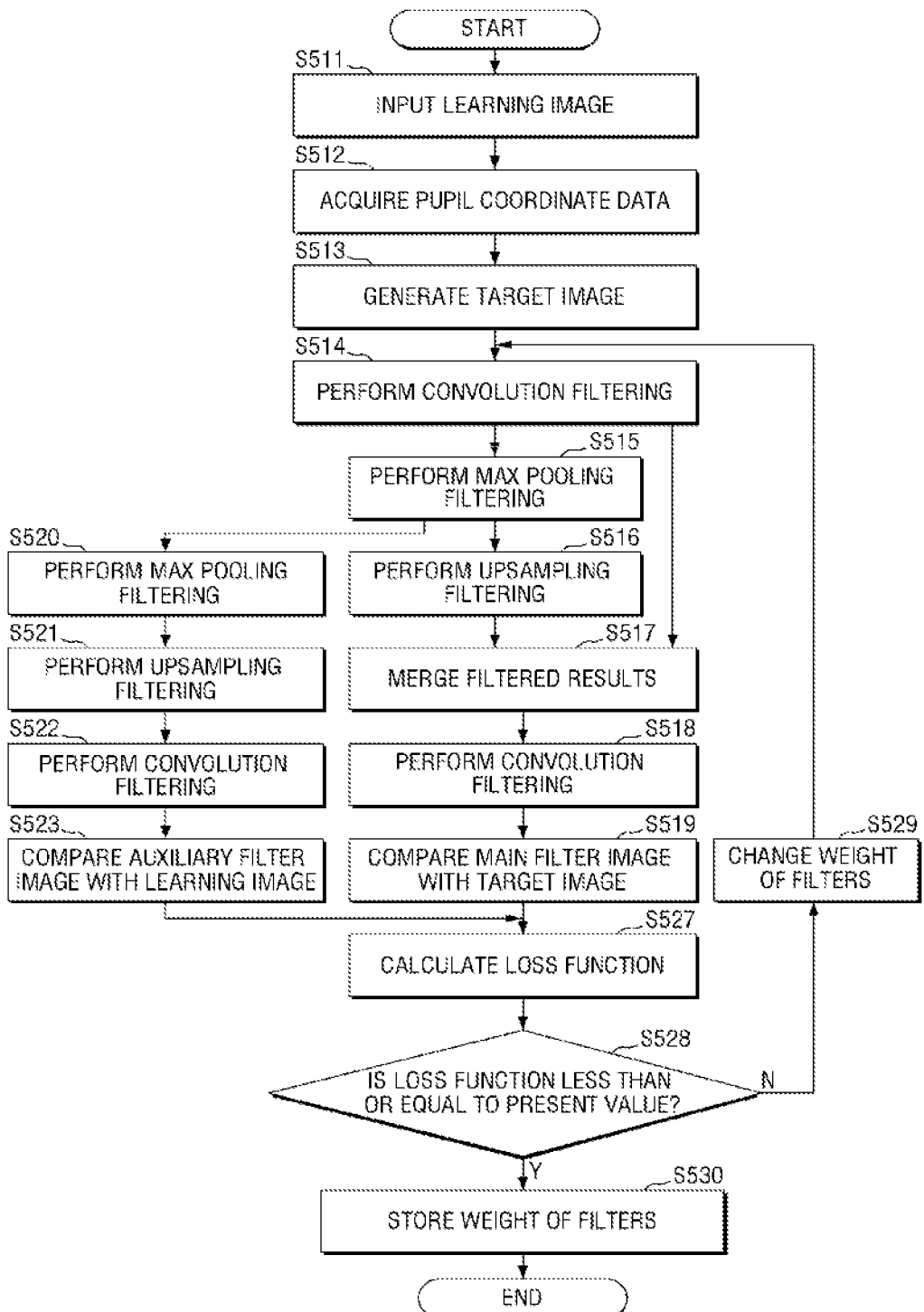
FIG. 15 is a flowchart illustrating another example of a process of learning a weight of the second neural network of FIG. 13.

FIG. 15 is a flowchart illustrating another example of a process of learning a weight of the second neural network of FIG. 13. The process of learning the weight of FIG. 15 differs from the process of learning the weight of FIG. 14 in operations following operation S523. Hereinafter, the same components as those described above will be briefly described or omitted.

Referring to FIG. 15, in operation S527, the detection unit 230 may calculate the loss function Loss based on the target image TI, the main filter image MFI, the learning image LI, and the auxiliary filter image AFI.

In operation S528, the detection unit 230 may determine whether the calculated loss function Loss is less than or equal to a preset value.

In operation S529, the detection unit 230 may change the weights of the first to eighth filters FT1 to FT8 to repeat a filtering process using the first to eighth filters FT1 to FT8 when the calculated loss function Loss exceeds the preset value. The detection unit 230 may change the weights of the first to eighth filters FT1 to FT8 based on the calculated loss function Loss. Therefore, as a number of learning times is increased, accuracy of the weights of the first to eighth filters FT1 to FT8 may be increased. Since the detection unit 230 includes the first to eighth filters FT1 to FT8, even when a relatively small number of learning times of a weight is performed, accuracies of the weight may be increased.

In operation S530, the detection unit 230 may store the weights of the first to eighth filters FT1 to FT8 when the calculated loss function Loss is less than or equal to the preset value. The stored weights of the first to eighth filters FT1 to FT8 may be used to generate a pupil area segmentation image based on an eye image.

Figure 16:
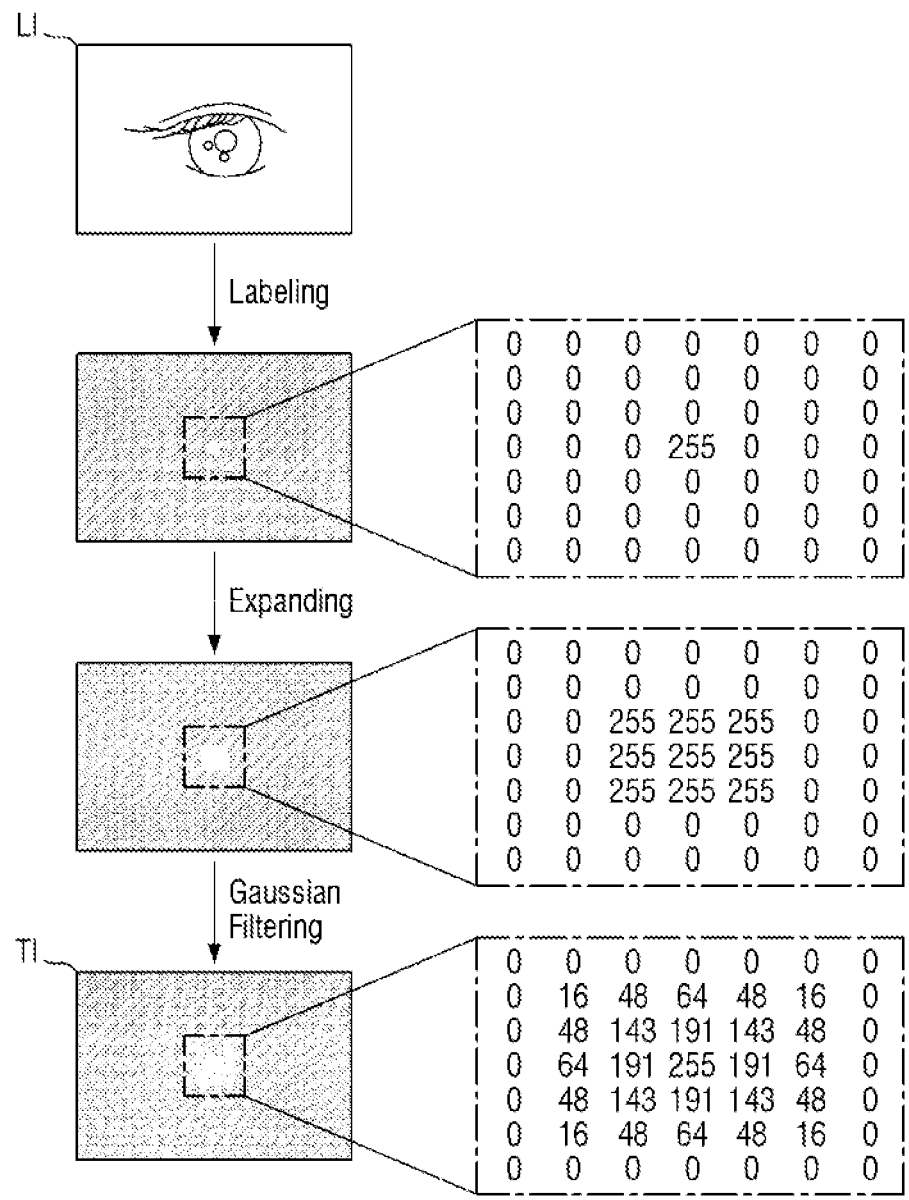
FIG. 16 is a diagram illustrating a process of generating a target image of the detection unit according to an exemplary embodiment.
Figure 17:
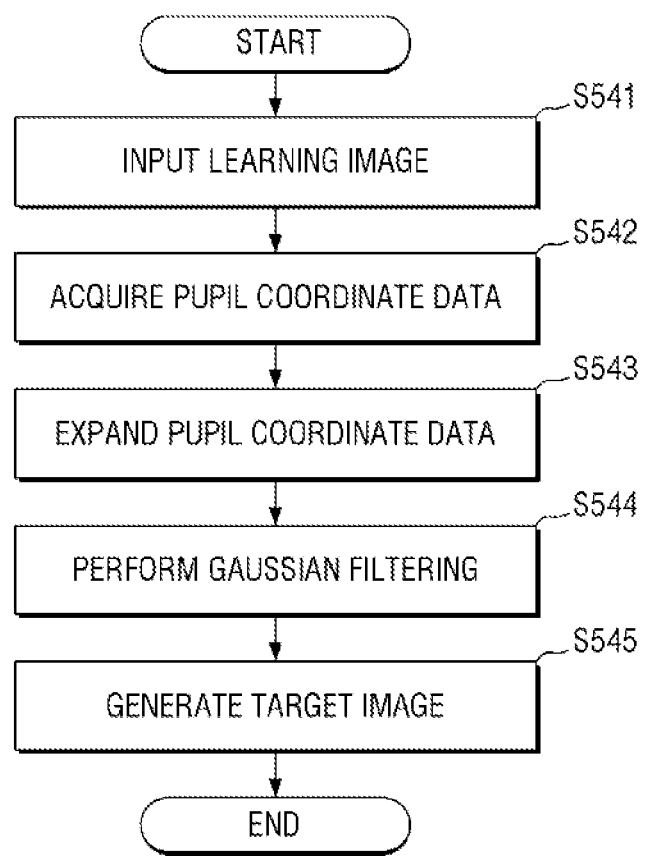
FIG. 17 is a flowchart illustrating the process of generating the target image of the detection unit according to an exemplary embodiment.

FIG. 16 is a diagram illustrating a process of generating a target image of the detection unit according to an exemplary embodiment, and FIG. 17 is a flowchart illustrating the process of generating the target image of the detection unit according to an exemplary embodiment.

Referring to FIGS. 16 and 17, in operation S541, the detection unit 230 may receive a learning image LI. Here, the learning image LI may include various images including meaningful information related to a pupil (for example, spatial information of the pupil) or positional information of the pupil, and the detection unit 230 may increase the accuracy of weight learning of the plurality of filters FT1 to FT8. Since the learning image LI includes various images, the detecting device 10 may increase the performance of detecting pupil coordinates from various input images.

In operation S542, the detection unit 230 may acquire pupil coordinate data from the learning image LI. Here, the pupil coordinate data may correspond to coordinate data of a pixel coinciding with a pupil center among a plurality of pixels of a pupil area. The detection unit 230 may acquire the pupil coordinate data by labeling the learning image LI. For example, a user may label the learning image LI by selecting or designating a pupil center in the learning image LI.

In operation S543, the detection unit 230 may expand the pupil coordinate data acquired from the learning image LI. The detection unit 230 may expand the pupil coordinate data from the pupil center to a certain range. For example, a pixel value of an expanded range may be the same as a pixel value of the pupil center. Therefore, a pixel within the expanded range among the pupil area may have a maximum pixel value (for example, a pixel value of 255).

In operation S544, the detection unit 230 may perform Gaussian filtering on the expanded pupil coordinate data. In operation S545, the detection unit 230 may generate a target image TI based on output of the Gaussian filtering. For example, the target image TI may have a maximum pixel value (for example, a pixel value of 255) at the pupil center through the Gaussian filtering, and a pixel value may be decreased as a distance from the pupil center is increased. The target image TI may include meaningful information related to a pupil (for example, spatial information of the pupil) based on a distribution area of the expanded pupil coordinate data and the maximum pixel value.

Figure 18:
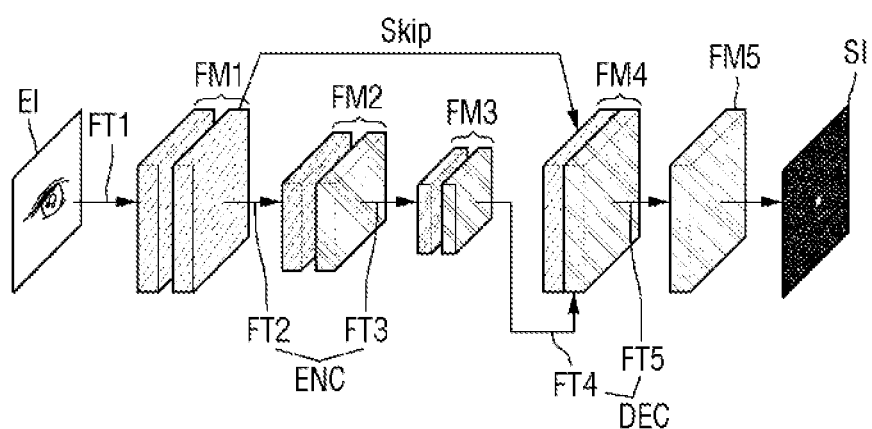
FIG. 18 is a diagram illustrating a process of generating a pupil area segmentation image of the detection unit according to an exemplary embodiment.
Figure 19:
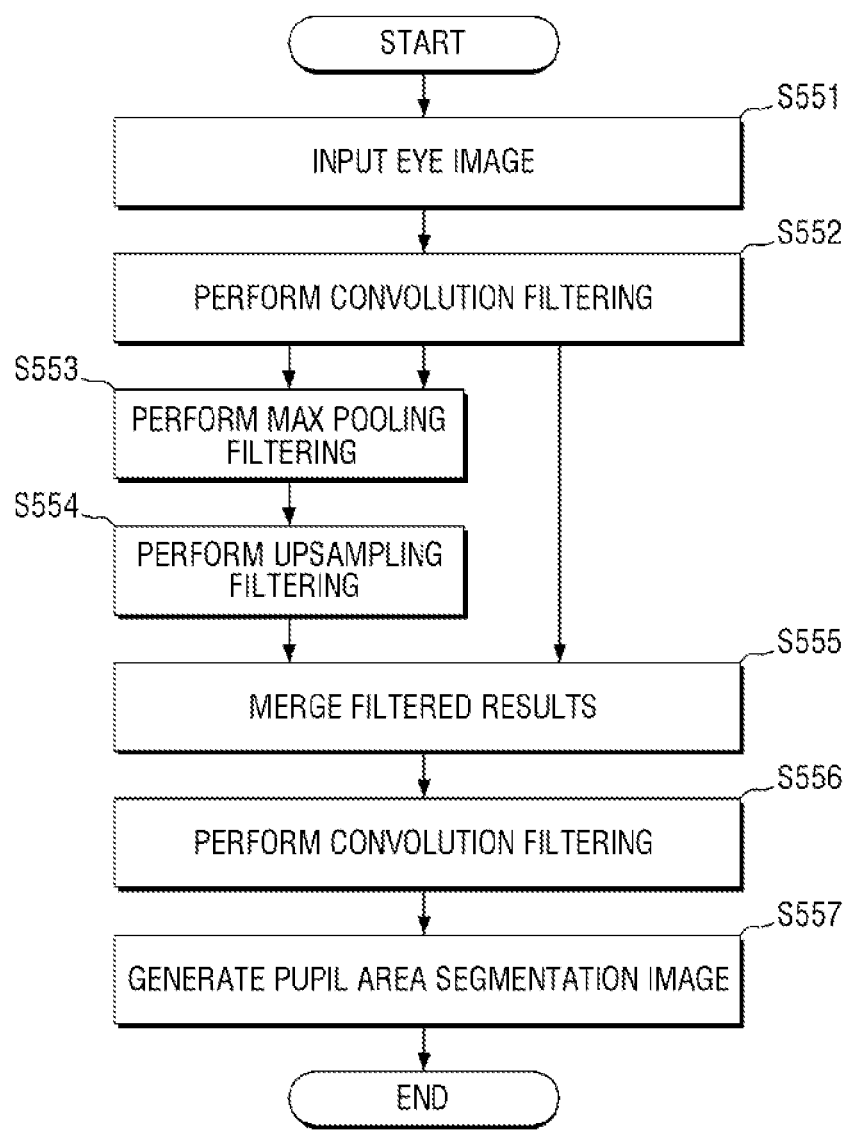
FIG. 19 is a flowchart illustrating the process of generating the pupil area segmentation image of the detection unit according to an exemplary embodiment.

FIG. 18 is a diagram illustrating a process of generating a pupil area segmentation image of the detection unit according to an exemplary embodiment, and FIG. 19 is a flowchart illustrating the process of generating the pupil area segmentation image of the detection unit according to an exemplary embodiment.

Referring to FIGS. 18 and 19, the detection unit 230 may generate a pupil area segmantation image SI with respect to an eye image EI using learned weights of a plurality of filters FT1 to FT5.

In operation S551, the detection unit 230 may receive the eye image EI generated based on landmarks of an eye.

In operation S552, the detection unit 230 may perform convolutional filtering on the eye image EI using a first filter FT1. For example, the first filter FT1 may output a first feature map FM1 by multiplying each of a plurality of pixels of the eye image EI by a weight and then adding up multiplication results. The first filter FT1 may perform a dot product of a filter weight and image data by sliding the filter weight over the image data.

In operation S553, the detection unit 230 may perform max-pooling filtering on the first feature map FM1 using an encoder ENC. The encoder ENC may include second and third filters FT2 and FT3.

The detection unit 230 may perform max-pooling filtering on the first feature map FM1 using the second filter FT2. The second filter FT2 may extract a main pixel value from the first feature map FM1 to output a second feature map FM2 with a small size.

The detection unit 230 may perform max-pooling filtering on the second feature map FM2 using the third filter FT3. The third filter FT3 may extract a main pixel value from the second feature map FM2 to output a third feature map FM3 with a small size.

In operation S554, the detection unit 230 may perform upsampling filtering on the third feature map FM3 using a fourth filter FT4. The fourth filter FT4 may increase the size of the third feature map FM3 reduced by the encoder ENC by as much as a size corresponding to the eye image EI. For example, the fourth filter FT4 may store a position of a pixel value before the first feature map FM1 passes through the encoder ENC to be reflected on the fourth feature map FM4.

The detection unit 230 may include a skip connection network Skip which connects a feature map input to the encoder ENC to a feature map in which upsampling filtering is performed on output of the encoder ENC. The skip connection network Skip may transfer data input to the encoder ENC to the output of the encoder ENC without change. For example, the first feature map FM1 may be subjected to max-pooling filtering by the encoder ENC and then may be subjected to upsampling filtering by the fourth filter FT4. In addition, the first feature map FM1 may be transferred along the skip connection network Skip. Therefore, a filtering process by the encoder ENC may be omitted and the first feature map FM1 may be merged with output of the fourth filter FT4. In addition to meaningful information related to a pupil of the first feature map FM1 or positional information of the pupil, the skip connection network Skip may provide detailed information or additional information of the first feature map FM1 to a decoder DEC.

In operation S555, the detection unit 230 may merge a filtering result of the fourth filter FT4 and a filtering result of the first filter FT1. The detection unit 230 may generate the fourth feature map FM4 by merging a feature map output from the fourth filter FT4 and the first feature map FM1 transferred by the skip connection network Skip. For example, the feature map output from the fourth filter FT4 may include main information of the eye image EI, and the first feature map FM1 may include both of the main information and additional information of the eye image EI. Therefore, the detection unit 230 may include the skip connection network Skip to prevent an error that may occur according to detailed information or additional information removed by the encoder ENC.

In operation S556, the detection unit 230 may perform convolution filtering on the fourth feature map FM4 using a fifth filter FT5. For example, the fifth filter FT5 may output a fifth feature map FM5 by multiplying each of a plurality of pixels of the fourth feature map FM4 by a weight and then adding up multiplication results. The fifth filter FT5 may perform a dot product of a filter weight and the fourth feature map FM4 by sliding the filter weight over the fourth feature map FM4.

In operation S557, the detection unit 230 may generate the pupil area segmentation image SI including pupil coordinate information based on the fifth feature map FM5.

Figure 20:
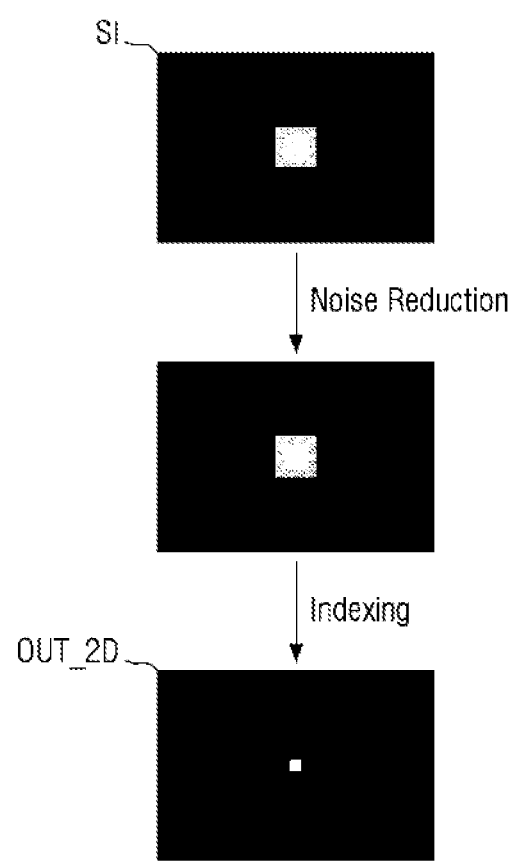
FIG. 20 is a diagram illustrating a process of detecting two-dimensional pupil coordinates of the detection unit according to an embodiment.
Figure 21:
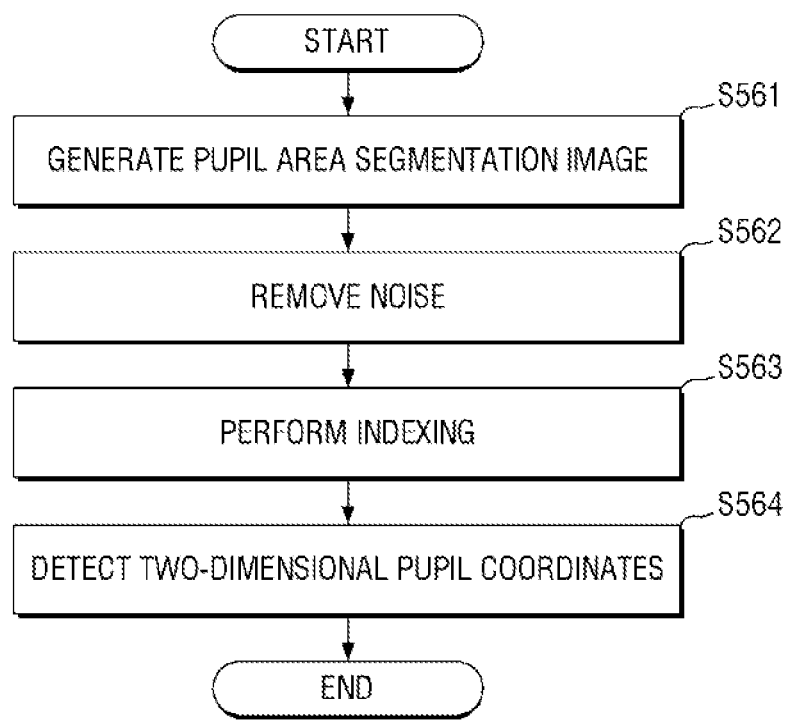
FIG. 21 is a flowchart illustrating the process of detecting the two-dimensional pupil coordinates of the detection unit according to the embodiment.

FIG. 20 is a diagram illustrating a process of detecting two-dimensional pupil coordinates of the detection unit according to an embodiment, and FIG. 21 is a flowchart illustrating the process of detecting the two-dimensional pupil coordinates of the detection unit according to the embodiment.

Referring to FIGS. 20 and 21, the detection unit 230 may receive a pupil area segmentation image SI to output two-dimensional pupil coordinates OUT_2D.

In operation S561, the detection unit 230 may generate the pupil area segmentation image SI.

In operation S562, the detection unit 230 may remove noise of the pupil area segmented image.

In operation S563, the detection unit 230 may perform indexing on the pupil area segmentation image from which the noise is removed.

In operation S564, the detection unit 230 may detect the two-dimensional pupil coordinates OUT_2D by selecting at least one pixel from among a plurality of pixels from which noise is removed. Accordingly, the detection unit 230 may detect the two-dimensional pupil coordinates OUT_2D by performing indexing on a pixel with a maximum pixel value in the pupil area segmentation image from which the noise is removed.

According to a detecting device according to exemplary embodiments, a determination unit can determine whether a user wears glasses from an input image. When the user wears the glasses, a generation unit can provide a face image from which the glasses are removed to a detection unit, and the detection unit can detect a pupil from the face image from which the glasses are removed. When the user does not wear the glasses, the detection unit can detect the pupil by receiving the input image without change. Therefore, the detecting device can prevent false detection and increase detection performance regardless of whether the user wears the glasses.

The effects of the present disclosure are not restricted to the exemplary embodiments set forth herein and more diverse effects are included in this specification.

What is claimed is:

1. A detecting device comprising:
   a determination unit configured to determine from an input image whether a user wears glasses by using a first neural network including a first plurality of filters;
   a generation unit configured to generate a face image in which the glasses are removed from the input image by using a learned generator when a glasses-wearing signal is received from the determination unit; and
   a detection unit configured to generate an eye image, by receiving the input image from the determination unit or receiving the face image from the generation unit, and to detect a pupil from the eye image using a second neural network including a second plurality of filters.

2. The detecting device of claim 1, wherein the first neural network comprises:
   a first filter configured to output a feature map by performing weighted convolution filtering;
   a second filter configured to calculate an overall average of pixel values of the feature map; and
   a third filter configured to apply an activation function to an output of the second filter.

3. The detecting device of claim 1, wherein the generation unit comprises:
   a first image set including images including a person wearing glasses;
   a second image set including images including a person not wearing glasses;
   a first generator configured to map a first image selected from the first image set to generate an image having a feature of the second image set; and
   a second generator configured to map a second image selected from the second image set to generate an image having a feature of the first image set.

4. The detecting device of claim 3, wherein the generation unit further comprises:
   a first function unit configured to calculate a probability that an image mapped by the first generator is included in the second image set; and
   a second function unit configured to calculate a probability that an image mapped by the second generator is included in the first image set.

5. The detecting device of claim 4, wherein the generation unit changes a weight of the first generator based on the probability calculated by the first function unit and changes a weight of the second generator based on the probability calculated by the second function unit.

6. The detecting device of claim 3, wherein the generation unit primarily maps the first image using the first generator and secondarily maps the first image using the second generator to compare an image, which is obtained by secondarily mapping the first image, with the first image, and
   the generation unit primarily maps the second image using the second generator and secondarily maps the second image using the first generator to compare an image, which is obtained by secondarily mapping the second image, with the second image.

7. The detecting device of claim 6, wherein the generation unit calculates a loss function based on a comparison result between the image, which is obtained by secondarily mapping the first image, and the first image and based on a comparison result between the image, which is obtained by secondarily mapping the second image, and the second image.

8. The detecting device of claim 7, wherein the generation unit changes a weight of each of the first and second generators based on the loss function.

9. The detecting device of claim 1, wherein the detection unit extracts landmarks of eyes from the input image or the face image and generates the eye image based on a midpoint between the landmarks of the eyes.

10. The detecting device of claim 1, wherein the detection unit generates a target image based on pupil coordinate data acquired from a learning image and learns a weight of the second neural network so as to allow a main filter image obtained by filtering the learning image using the second neural network to be similar to the target image by as much as a preset reference.

11. The detecting device of claim 10, wherein the second neural network comprises:
    a first filter configured to output a feature map by performing weighted convolution filtering;
    a fourth filter configured to select a max value from an input feature map to perform max-pooling filtering; and
    a fifth filter configured to perform upsampling filtering on the input feature map.

12. The detecting device of claim 11, wherein the second neural network comprises an encoder comprising at least one fourth filter.

13. The detecting device of claim 12, wherein the second neural network further comprises a skip connection network which connects a feature map input to the encoder to a feature map in which upsampling filtering is performed on output of the encoder.

14. The detecting device of claim 12, wherein the second neural network further comprises an auxiliary filter comprising at least one fourth filter and at least one fifth filter.

15. The detecting device of claim 14, wherein the detection unit merges the feature map input to the encoder and the feature map in which the upsampling filtering is performed on output of the encoder, generates a main filter image by performing convolution filtering on the merged feature map, and generates an auxiliary filter image by filtering output of the encoder using the auxiliary filter.

16. The detecting device of claim 15, wherein the detection unit calculates a loss function based on the target image, the main filter image, the learning image, and the auxiliary filter image and changes a weight of the second neural network according to the loss function.

17. The detecting device of claim 11, wherein the second neural network comprises a decoder comprising at least one fifth filter and at least one first filter.

18. The detecting device of claim 10, wherein the detection unit acquires pupil coordinate data by labeling the learning image and generates the target image by expanding the pupil coordinate data and performing Gaussian filtering.

19. The detecting device of claim 10, wherein the detection unit generates a pupil area segmentation image by filtering the eye image using the learned second neural network and detects two-dimensional pupil coordinates by removing noise of the pupil area segmentation image and indexing the pupil area segmentation image.

20. The detecting device of claim 19, wherein the detection unit detects three-dimensional pupil coordinates by correcting the two-dimensional pupil coordinates based on depth information extracted from the input image.

21. A method of detecting eye information, the method comprising:
    receiving an input image;
    determining that a user is wearing glasses based on the input image using a first neural network including a first plurality of filters;
    generating a face image from the input image based on the determination, wherein the face image comprises an image of the user without glasses;
    detecting eye information of the user based on the face image using a second neural network including a second plurality of filters.

22. The method of claim 21, the method further comprising:
    extracting an eye image from the face image, wherein the eye information is detected based on the extracted eye image.

23. The method of claim 21, the method further comprising:
    performing convolution filtering on the input image;
    performing global average pooling based on an output of the convolution filtering; and
    applying an activation function to an output of the global average pooling, wherein the determination that the user is wearing glasses is based on the activation function.

24. A method of detecting eye information, the method comprising:
    receiving an input image;
    determining that a user is wearing glasses based on the input image;
    generating a face image from the input image based on the determination, wherein the face image comprises an image of the user without glasses;
    detecting two-dimensional pupil coordinates;
    extracting depth information from the input image;
    generating three-dimensional pupil coordinates based on the two-dimensional pupil coordinates and the depth information; and
    detecting eye information of the user based at least in part on the three-dimensional pupil coordinates.

* * * * *